United States Patent
Lee et al.

(10) Patent No.: US 10,891,074 B2
(45) Date of Patent: Jan. 12, 2021

(54) KEY-VALUE STORAGE DEVICE SUPPORTING SNAPSHOT FUNCTION AND OPERATING METHOD THEREOF

(71) Applicant: SAMSUNG ELECTRONICS CO., LTD., Suwon-si (KR)

(72) Inventors: Yong-Hwa Lee, Seoul (KR); Young-Ho Park, Anyang-si (KR); Byung-Ki Lee, Hwaseong-si (KR); Hyung-Chul Jang, Suwon-si (KR); Je-Kyeom Jeon, Siheung-si (KR); Sung-Kug Cho, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 192 days.

(21) Appl. No.: 16/055,203

(22) Filed: Aug. 6, 2018

(65) Prior Publication Data
US 2019/0087130 A1    Mar. 21, 2019

(30) Foreign Application Priority Data
Sep. 20, 2017    (KR) .......................... 10-2017-0121312

(51) Int. Cl.
*G06F 3/06* (2006.01)
*G06F 11/14* (2006.01)
(Continued)

(52) U.S. Cl.
CPC ............ *G06F 3/0659* (2013.01); *G06F 3/065* (2013.01); *G06F 3/0614* (2013.01);
(Continued)

(58) Field of Classification Search
None
See application file for complete search history.

(56) References Cited

U.S. PATENT DOCUMENTS 8,775,773 B2    7/2014    Acharya et al.
8,788,788 B2    7/2014    Colgrove et al.
(Continued)

FOREIGN PATENT DOCUMENTS

| CN | 104238963 A | 12/2014 | |
|---|---|---|---|
| CN | 106802939 A | 6/2017 | |
| WO | WO-2016050112 A1 * | 4/2016 | ............. G06F 16/00 |

OTHER PUBLICATIONS

Singapore First Office Action Corresponding to Application No. SG 10201805093T, dated Nov. 26, 2018.

*Primary Examiner* — Charles Rones
*Assistant Examiner* — Jonah C Krieger
(74) *Attorney, Agent, or Firm* — Volentine, Whitt & Francos, PLLC

(57) ABSTRACT

A method of operating a key-value storage device includes a key-value storage device receiving from a host a first command including a first key, a first value, and a first snapshot identification (ID), the key-value storage device generating a first snapshot entry including the first snapshot ID, the first key, and a first physical address in a non-volatile memory device at which the first value is written, in response to the received first command, receiving from the host a second command including the first key, a second value, and a second snapshot ID, and in response to the received second command, the key-value storage device generating a second snapshot entry including the second snapshot ID, the first key, and a second physical address in the non-volatile memory device at which the second value is written.

20 Claims, 27 Drawing Sheets

(51) Int. Cl.
G06F 16/901 (2019.01)
G06F 16/23 (2019.01)

(52) U.S. Cl.
CPC .......... G06F 3/0679 (2013.01); G06F 3/0685 (2013.01); G06F 11/1448 (2013.01); G06F 16/2358 (2019.01); G06F 16/901 (2019.01); G06F 2201/84 (2013.01)

(56) References Cited

U.S. PATENT DOCUMENTS

| | | | |
|---|---|---|---|
| 9,037,544 B1 | 5/2015 | Zheng et al. | |
| 9,152,684 B2 | 10/2015 | Zheng et al. | |
| 9,244,993 B1 | 1/2016 | Adoc, Jr. et al. | |
| 9,311,327 B1 | 4/2016 | Xing | |
| 9,438,426 B2 | 9/2016 | Li et al. | |
| 9,471,248 B2 | 10/2016 | Zheng et al. | |
| 9,519,666 B2 | 12/2016 | Friedman | |
| 9,569,141 B2 | 2/2017 | Foong et al. | |
| 9,697,267 B2 | 7/2017 | Kadayam et al. | |
| 2010/0205391 A1* | 8/2010 | Miyamoto | G06F 11/008 711/162 |
| 2014/0143369 A1 | 5/2014 | Dobre | |
| 2014/0344539 A1* | 11/2014 | Gordon | G06F 3/065 711/162 |
| 2015/0193315 A1 | 7/2015 | Cheong | |
| 2015/0286695 A1 | 10/2015 | Kadayam et al. | |
| 2016/0011791 A1* | 1/2016 | Sawada | G06F 3/0611 711/114 |
| 2016/0077920 A1 | 3/2016 | Regni et al. | |
| 2016/0078052 A1 | 3/2016 | Srivas et al. | |
| 2016/0162562 A1 | 6/2016 | Hattori | |
| 2016/0210302 A1 | 7/2016 | Xia | |
| 2016/0266978 A1 | 9/2016 | Regni et al. | |
| 2016/0275089 A1 | 9/2016 | Soundararajan et al. | |
| 2016/0350006 A1 | 12/2016 | Wang et al. | |
| 2017/0031769 A1 | 2/2017 | Zheng et al. | |
| 2017/0031774 A1 | 2/2017 | Bolen et al. | |
| 2017/0032005 A1 | 2/2017 | Zheng et al. | |
| 2017/0032013 A1 | 2/2017 | Zheng et al. | |
| 2017/0153829 A1 | 6/2017 | Patel et al. | |
| 2017/0177448 A1 | 6/2017 | Muth et al. | |
| 2018/0218000 A1* | 8/2018 | Setty | G06F 16/164 |
| 2019/0132232 A1* | 5/2019 | Ammireddy | H04L 45/54 |

* cited by examiner

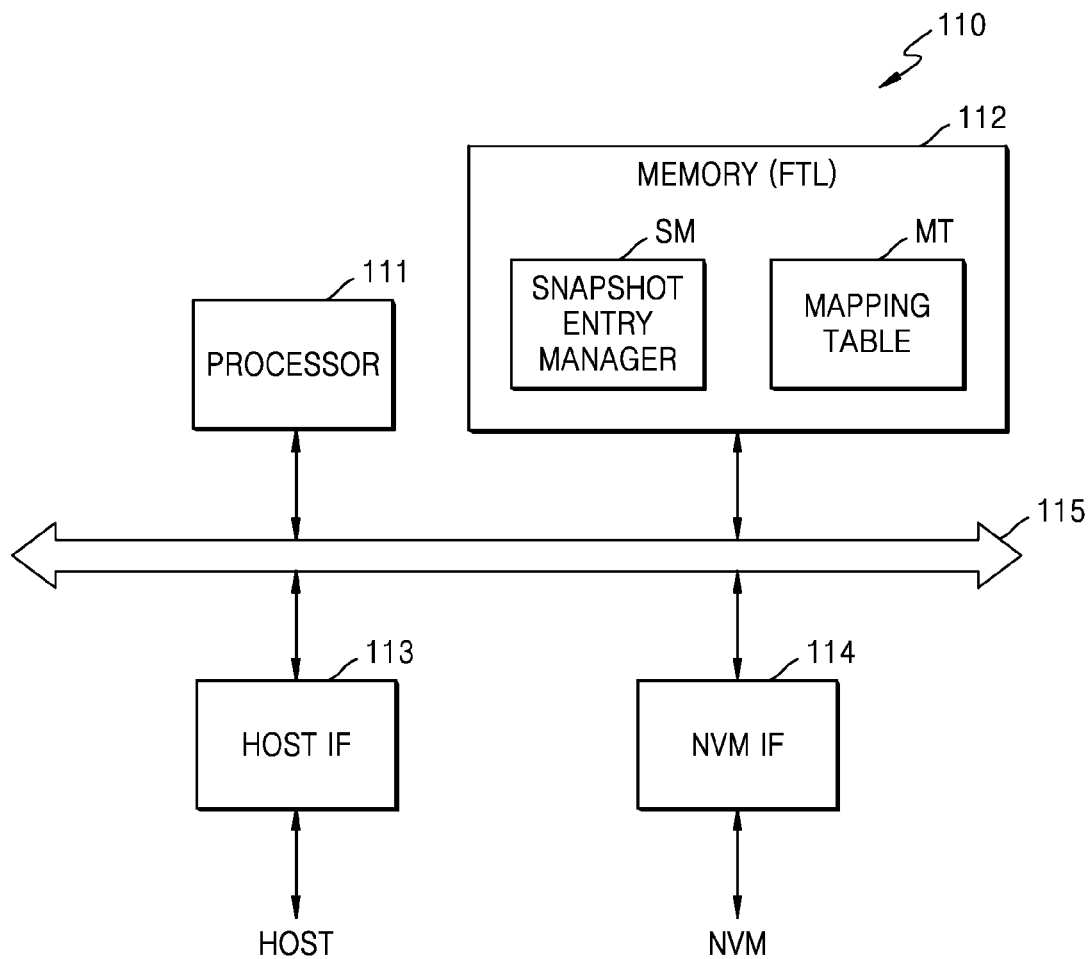

KEY-VALUE STORAGE DEVICE SUPPORTING SNAPSHOT FUNCTION AND OPERATING METHOD THEREOF

CROSS-REFERENCE TO RELATED APPLICATION

This application claims the benefit of Korean Patent Application No. 10-2017-0121312, filed on Sep. 20, 2017, in the Korean Intellectual Property Office, the disclosure of which is incorporated herein in its entirety by reference.

BACKGROUND

The inventive concept relates to a storage device, and more particularly, to a key-value storage device supporting a snapshot function, and an operating method thereof.

Storage devices may be categorized into object-based storage devices and block-based storage devices, based on a unit of managing data. The object-based storage devices have a storage structure which stores and manages data in an object form. The object is data having an arbitrary size and denotes, for example, multimedia data such as a video or an image, a file, or the like. The object-based storage devices may be used for managing objects. Examples of the object-based storage devices may include, for example, key-value storage devices.

SUMMARY

Disclosed herein are a key-value storage device supporting a snapshot function and an operating method thereof.

According to an aspect of the inventive concept, there is provided an operating method of a key-value storage device including a non-volatile memory. The operating method includes: the key-value storage device receiving from a host a first command including a first key, a first value, and a first snapshot identification (ID); in response to the received first command the key-value storage device generating a first snapshot entry including the first snapshot ID, the first key, and a first physical address in the non-volatile memory at which the first value is written; the key-value storage device receiving from the host a second command including the first key, a second value, and a second snapshot ID; and in response to the received second command the key-value storage device generating a second snapshot entry including the second snapshot ID, the first key, and a second physical address in the non-volatile memory at which the second value is written.

According to another aspect of the inventive concept, there is provided an operating method of a key-value storage device including a non-volatile memory. The operating method includes: the key-value storage device storing in a mapping table a plurality of snapshot entries for a first key, the plurality of snapshot entries respectively corresponding to a plurality of snapshot IDs; the key-value storage device receiving from a host a first read command including the first key; in response to the received first read command the key-value storage device performing a read operation on the non-volatile memory, based on a latest snapshot entry of the plurality of snapshot entries; the key-value storage device receiving from the host a second read command including a first snapshot ID and the first key; and in response to the received second read command the key-value storage device performing a read operation on the non-volatile memory, based on a first snapshot entry corresponding to the first snapshot ID among the plurality of snapshot entries.

According to another aspect of the inventive concept, there is provided an operating method of a key-value storage device including a non-volatile memory. The operating method includes: the key-value storage device storing in a mapping table a plurality of snapshot entries each including a snapshot ID, a key, and a physical address in the non-volatile memory; key-value storage device receiving from a host a first delete command including a first snapshot ID; in response to the received first delete command the key-value storage device deleting at least one snapshot entry corresponding to the first snapshot ID from among the plurality of snapshot entries; the key-value storage device receiving from the host a second delete command including the first snapshot ID and a first key; and in response to the received second delete command the key-value storage device deleting a first snapshot entry corresponding to the first snapshot ID and the first key from among the plurality of snapshot entries.

According to another aspect of the inventive concept, there is provided a key-value storage device capable of communicating with a host, the key-value storage device including a non-volatile memory configured to store a value corresponding to a key; and a controller configured to receive from the host a command including a snapshot identification (ID), the key, and the value, and in response to the received command to generate a snapshot entry including the snapshot ID, the key, and a physical address in the non-volatile memory at which the value is written.

According to yet another aspect of the inventive concept, a system is provided comprising: a non-volatile memory configured to store a plurality of values; a memory device configured to store a mapping table comprising at least one snapshot entry, wherein each snapshot entry includes a snapshot identification (ID), a key, and a physical address where a value corresponding to the key is stored in the non-volatile memory; and a controller configured to control operations of the non-volatile memory and the memory device, and further configured to receive from a host a command including a snapshot identification (ID), the key, and the value, and in response to the received command from the host to generate the snapshot entry and store the snapshot entry in the memory device.

BRIEF DESCRIPTION OF THE DRAWINGS

Embodiments of the inventive concept will be more clearly understood from the following detailed description taken in conjunction with the accompanying drawings.

FIG. 5 is a block diagram illustrating an embodiment of a controller of FIG. 1.

FIG. 6 shows an example embodiment of a mapping table of FIG. 5,

DETAILED DESCRIPTION OF THE EMBODIMENTS

Figure 1:
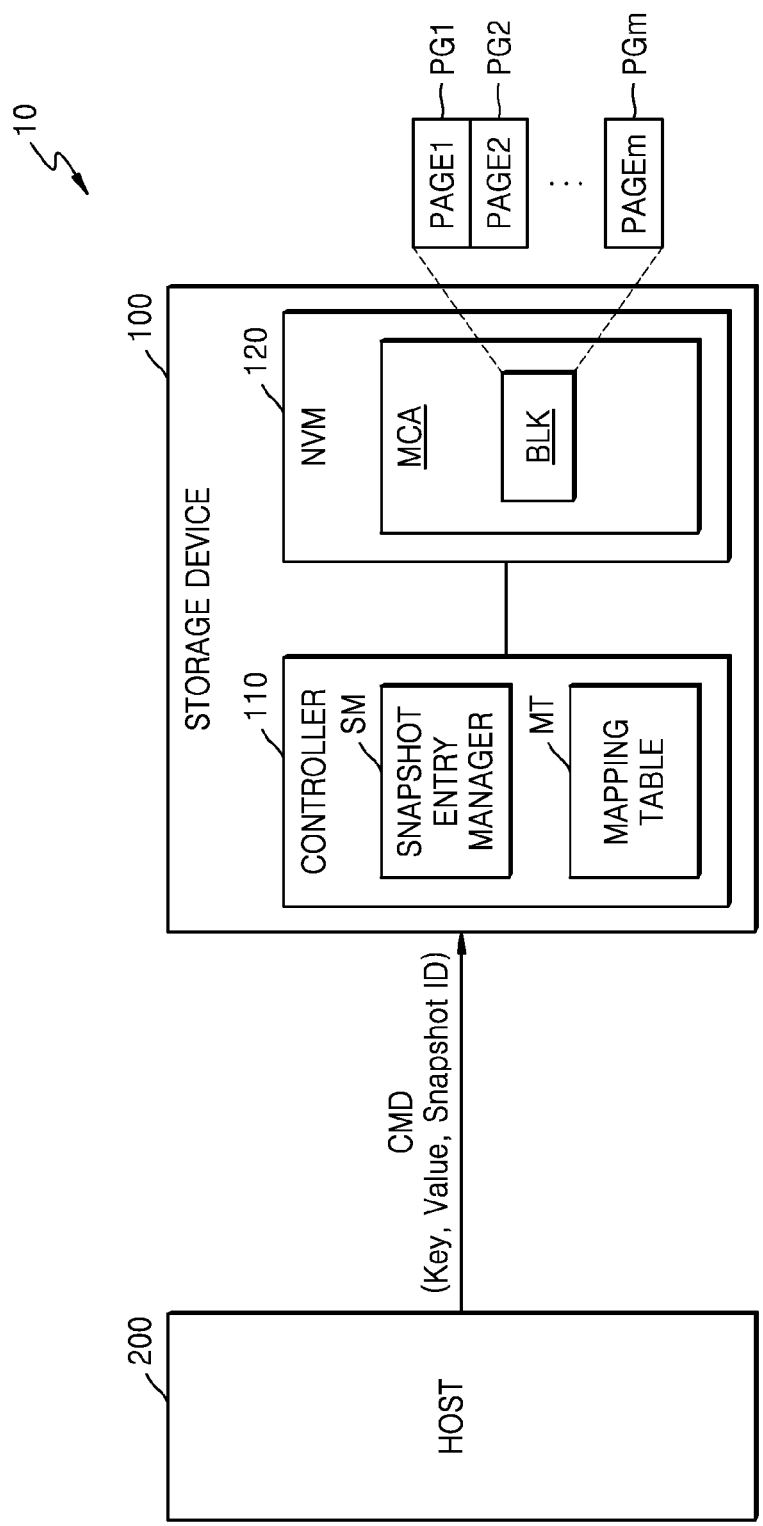
FIG. 1 is a block diagram illustrating an embodiment of a storage system.

FIG. 1 is a block diagram illustrating an embodiment of a storage system 10. Referring to FIG. 1, storage system 10 may include a storage device 100 and a host 200. Storage device 100 may include a controller 110 and a non-volatile memory (NVM) 120. Host 200 may communicate with storage device 100 through various interfaces. For example, host 200 may be implemented with an application processor (AP) or a system-on-a-chip (SoC).

In an embodiment, storage device 100 may be a key-value storage device or a key-value store, and for example, may be a key-value solid state drive (SSD). The key-value storage device may be a device which quickly and simply processes data by using a key-value pair. Here, the key-value pair may be a pair consisting of a key having uniqueness and a value which is data corresponding to the key, and may be referred to as a tuple or a key-value tuple. In the key-value pair, the key may be represented as an arbitrary string such as a file name, a uniform resource identifier (URI), or a hash, and the value may be arbitrary kind of data such as an image or a user preference file or document. In this case, a size of each of the key and the value may be variable, and for example, a size of the value may vary based on data included in the value.

Hereinafter, an embodiment where storage device 100 is a key-value storage device will be described, and in the present specification, storage device 100 may be used as having the same meaning as a key-value storage device or a key-value store. However, storage device 100 is not limited to being a key-value storage device and may be applied to an arbitrary object cache system or object storage system which manages data by units of objects. Therefore, storage device 100 may manage data by units of objects in an arbitrary manner instead of the key-value pair.

Host 200 may transmit a command CMD including a snapshot identification (ID) to storage device 100 as a command packet for example. Storage device 100 may support a snapshot function in response to the command CMD. In detail, storage device 100 may generate mapping data based on the snapshot ID as a snapshot entry, and the snapshot entry may include a snapshot ID, a key, and a physical address. In this case, the physical address may denote a physical address of NVM 120 for writing a value corresponding to a key. Therefore, storage device 100 may autonomously support the snapshot function, and host 200 may configure the snapshot entry having a tree type. Accordingly, host 200 may not internally manage the snapshot entry, thereby reducing overhead managing the snapshot entry.

The snapshot function may be a function of maintaining a data structure at a certain moment, for preventing the loss of data (i.e., a value) stored in storage device 100. In detail, a snapshot or snapshot replication may denote that a data structure at a certain moment is maintained like taking a picture, for the purpose of restoring a system in a database or a filesystem. Once a snapshot entry is generated, even when data is deleted or changed due to a malicious code, virus, or a mistake of a user, data may be restored with respect to the time when the snapshot entry is generated. In this case, a snapshot may be implemented as a method of copying only metadata such as mapping data, instead of a method of copying user data. Accordingly, although the capacity of an original file may be large, the capacity of the snapshot entry may be very small, and thus, backup can be efficiently performed.

In an embodiment, host 200 may transmit a command CMD (for example, a write request) including a key-value pair to storage device 100, and in response to the command CMD, storage device 100 may write a value in NVM 120. In this case, host 200 may generate the command CMD including the key-value pair having a variable size without changing the key-value pair by units of logical block addresses (LBAs) having a fixed size and may transmit the generated command CMD to storage device 100.

In an embodiment, host 200 may transmit a command CMD (for example, a read request) including a key to storage device 100, and in response to the command CMD, storage device 100 may read the value stored in NVM 120. In this case, host 200 may generate the command CMD including the key having a variable size without changing the key by units of LBAs having a fixed size, and may transmit the generated command CMD to storage device 100.

Controller 110 may read the value stored in NVM 120 in response to the read request or a read command from host 200, or in response to the write request or a write command from host 200, controller 110 may control NVM 120 to write the value in NVM 120. In the present embodiment, controller 110 may include a snapshot entry manager SM and a mapping table MT.

The snapshot entry manager SM may manage the snapshot entry in response to the command CMD including the snapshot ID. Subsequently, the snapshot entry manager SM may generate the snapshot entry corresponding to the snapshot ID in response to the command CMD including the key-value pair and the snapshot ID. The snapshot entry may include a snapshot ID, the key included in the key-value pair, and a physical address for writing the value included in the key-value pair.

The mapping table MT may store a plurality of snapshot entries. In detail, the mapping table MT may store mapping data, representing a correspondence relationship between a key and a physical address, by snapshot IDs. For example, the mapping data may represent a correspondence relationship between the key and a physical page number (PPN), and thus, may be referred to as a key-to-PPN (K2P) mapping table. In an embodiment, the mapping table MT may be copied into NVM 120, thus, NVM 120 may also store the mapping table MT.

NVM 120 may include a memory cell array (MCA), and the MCA may include a memory block BLK. The memory block BLK may include a plurality of pages PG1 to PGm. Here, m may be a positive integer and may be variously changed according to an embodiment. For example, the memory block BLK may be a unit of deletion (i.e., a unit of memory cells for which data in the memory cells may be deleted in one operation), and a page may be a unit of write and read (i.e., a unit of memory cells for which data in the memory cells may be read from or written to in one operation). In some embodiments, the MCA may include a plurality of memory blocks, a plurality of planes, a plurality of dies, and/or a plurality of chips. In an embodiment, NVM 120 may include a flash memory device, and for example, may include a NAND flash memory device. However, NVM 120 is not limited thereto, and NVM 120 may include a resistive memory device such as resistive random access memory (ReRAM), phase change random access memory (PRAM), or magnetic random access memory (MRAM).

Storage system 10 may be implemented with, for example, a personal computer (PC), a data server, a network-attached storage (NAS), an Internet of things (IoT) device, a portable electronic device, or the like. The portable electronic device may be a laptop computer, a mobile phone, a smartphone, a tablet PC, a personal digital assistant (PDA), an enterprise digital assistant (EDA), a digital still camera, a digital video camera, an audio device, a portable multimedia player (PMP), a personal navigation device (PND), an MP3 player, a handheld game console, an e-book, a wearable device, or the like.

In some embodiments, storage device 100 may be an internal memory embedded into an electronic device. For example, storage device 100 may be an SSD, an embedded universal flash storage (UFS) memory device, an embedded multimedia card (eMMC), or the like. In some embodiments, storage device 100 may be an external memory detachable/attachable from/on an electronic device. For example, storage device 100 may be UFS memory card, compact flash (CF), secure digital (SD), micro secure digital (Micro-SD), mini secure digital (Mini-SD), extreme digital (xD), memory stick, or the like.

Figure 2:
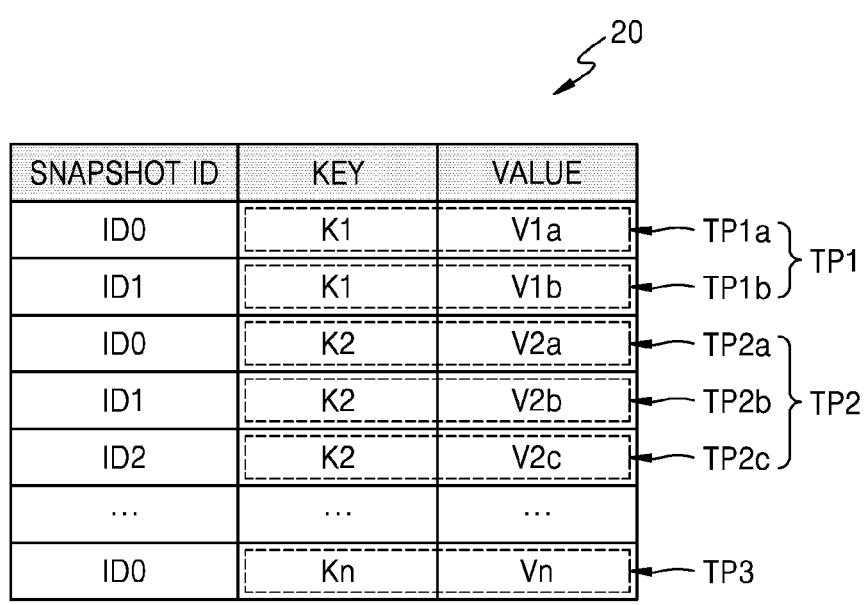
FIG. 2 is an embodiment of a table showing a plurality of key-value pairs.

FIG. 2 is a table 20 showing an embodiment of a plurality of key-value pairs. Referring to FIGS. 1 and 2, storage device 100 may manage a plurality of tuples for each of a plurality of keys so as to support the snapshot function, and a plurality of tuples may respectively correspond to a plurality of snapshot IDs. For example, a plurality of tuples TP1 corresponding to a first key K1 may include a first tuple TP1a corresponding to a first snapshot ID ID0 and a second tuple TP1b corresponding to a second snapshot ID ID1. For example, a plurality of tuples TP2 corresponding to a second key K2 may include a first tuple TP2a corresponding to the first snapshot ID ID0, a second tuple TP2b corresponding to the second snapshot ID ID1, and a third tuple TP2c corresponding to a third snapshot ID ID2. For example, a value corresponding to the first snapshot ID ID0 and the first key K1 may be V1a, a value corresponding to the first snapshot ID ID0 and the second key K2 may be V2a, and a value corresponding to the first snapshot ID ID0 and an nth key Kn may be Vn. For example, a value corresponding to the second snapshot ID ID1 and the first key K1 may be V1b, and a value corresponding to the second snapshot ID ID1 and the second key K2 may be V2b. For example, a value corresponding to the third snapshot ID ID2 and the second key K2 may be V2c. Storage device 100 may maintain a data structure at a certain time corresponding to a certain snapshot ID by using the mapping table MT which stores a plurality of snapshot entries respectively corresponding to a plurality of snapshot IDs ID0 to ID2. Hereinafter, the mapping table MT storing a plurality of snapshot entries will be described in detail.

Figure 3:
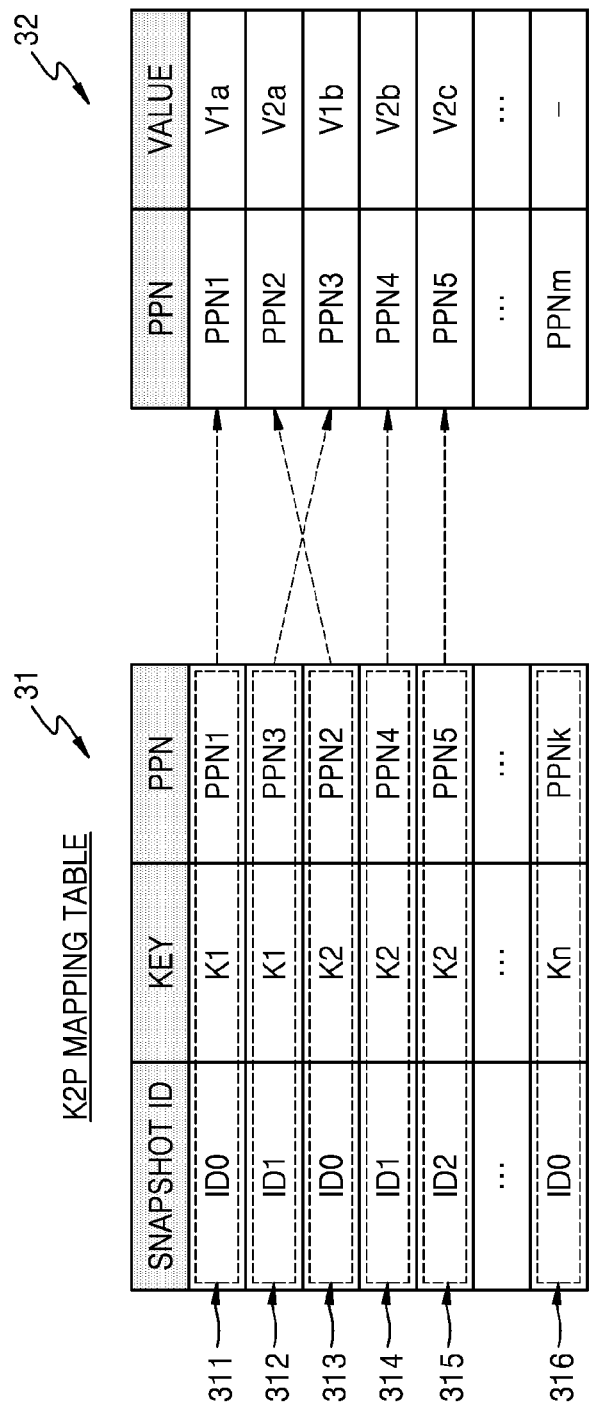
FIG. 3 shows an embodiment of a key-to-physical page number (K2P) mapping table.

FIG. 3 shows an embodiment of a K2P mapping table 31. For example, K2P mapping table 31 may correspond to the plurality of key-value pairs of FIG. 2.

Referring to FIGS. 1 to 3, the K2P mapping table 31 may correspond to an example of the mapping table MT of FIG. 1 and may store a plurality of snapshot entries 311 to 316. Each of the plurality of snapshot entries 311 to 316 may correspond to mapping data corresponding to a snapshot ID and may include a snapshot ID, a key, and a PPN. In an embodiment, pieces of mapping data based on snapshot IDs for the same key may be generated, and pieces of mapping data may be stored as a plurality of snapshot entries.

For example, first and second snapshot entries 311 and 312 may be generated for the first key K1. First snapshot entry 311 may be mapping data corresponding to the first key K1 at a time corresponding to the first snapshot ID ID0 and may include the first snapshot ID ID0, the first key K1, and a PPN1. Second snapshot entry 312 may be mapping data corresponding to the first key K1 at a time corresponding to the second snapshot ID ID1 and may include the second snapshot ID ID1, the first key K1, and a PPN3.

An NVM 32 may correspond to an example of NVM 120 of FIG. 1 and may respectively store a plurality of values in a plurality of PPNs (for example, PPN1 to PPNm). For example, the plurality of PPNs (for example, the PPN1 to PPNm) may respectively correspond to the pages PG1 to PGm of FIG. 1. For example, a first value V1a corresponding to the first key K1 may be stored in the PPN1 at a time corresponding to the first snapshot ID ID0, and a second value V1b corresponding to the first key K1 may be stored in the PPN3 at a time corresponding to the second snapshot ID ID1.

According to embodiments, storage device 100 may store the plurality of snapshot entries 311 to 316 in the K2P mapping table 31, thereby supporting the snapshot function autonomously. In detail, when a read request is received from host 200, storage device 100 may read a value stored in NVM 32 by using K2P mapping table 31. A read operation of storage device 100 will be described below with reference to FIGS. 4A and 4B.

Figure 4A:
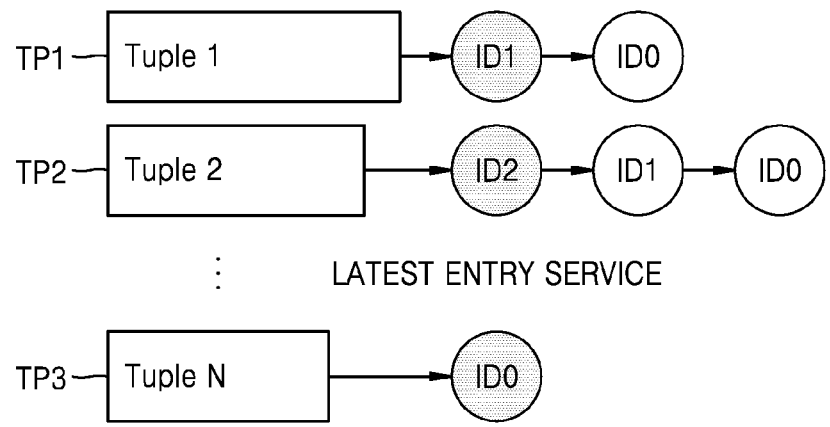
FIGS. 4A and 4B illustrate an embodiment of read operations.
Figure 4B:
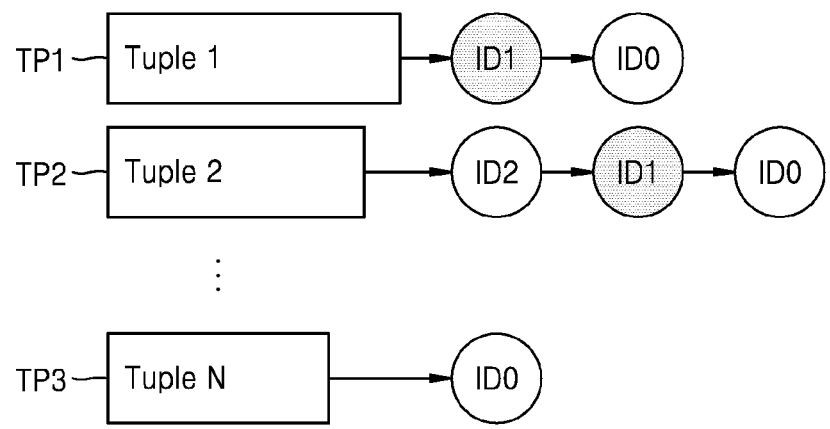

FIGS. 4A and 4B illustrate an embodiment of read operations. For example, a plurality of tuples TP1 to TP3 illustrated in FIGS. 4A and 4B may respectively correspond to the tuples TP1 to TP3 of FIG. 2.

Referring to FIGS. 1, 3, and 4A, when a normal read request including no snapshot ID is received from host 200, storage device 100 may perform a read operation, based on a latest snapshot entry of the plurality of snapshot entries 311 to 316 stored in K2P mapping table 31. For example, when a read command including the second key K2 is received from host 200, storage device 100 may search for a third snapshot entry 315, corresponding to the latest snapshot entry of the plurality of snapshot entries 313 to 315 for the second key K2, in K2P mapping table 31. Subsequently, storage device 100 may read a third value V2c from NVM 32 by using a physical address (i.e., the PPN5) included in third snapshot entry 315.

Referring to FIGS. 1, 3, and 4B, when a snapshot read request including a snapshot ID is received from host 200, storage device 100 may perform a read operation, based on a snapshot entry, corresponding to the snapshot ID, of the plurality of snapshot entries 311 to 316 stored in K2P mapping table 31. For example, when a read command including the second key K2 and the second snapshot ID ID1 is received from host 200, storage device 100 may search for a snapshot entry 314, corresponding to the second snapshot ID ID1 among the snapshot entries 313 to 315 for the second key K2, in K2P mapping table 31. Subsequently, storage device 100 may read a second value V2b from NVM 32 by using a physical address (i.e., the PPN4) included in second snapshot entry 314.

FIG. 5 is a block diagram illustrating an embodiment of controller 110 of FIG. 1. Referring to FIG. 5, controller 110 may include a processor 111, a memory 112, a host interface 113, and an NVM interface 114, which may communicate with one another through a bus 115. Processor 111 may include a central processing unit (CPU) or a microprocessor and may control an overall operation of controller 110. Memory 112 may operate according to control by processor 111 and may be used as a working memory, a buffer memory, a cache memory, or the like. For example, memory 112 may be implemented with a volatile memory such as dynamic random access memory (DRAM) or static random access memory (SRAM) or an NVM such as PRAM or flash memory.

The snapshot entry manager SM may be implemented with firmware or software and may be loaded into memory 112. In an embodiment, the snapshot entry manger SM may be implemented in a flash translation layer (FTL) and may be loaded into memory 112. However, the present embodiment is not limited thereto, and the snapshot entry manger SM may be implemented with hardware. The mapping table MT may be stored in, for example, K2P mapping table 31 and may be loaded into memory 112.

Host interface 113 may provide an interface between host 200 and controller 110, and for example, may provide an interface based on universal serial bus (USB), MMC, PCI-express (PCI-E), AT attachment (ATA), serial AT attachment (SATA), parallel AT attachment (PATA), small computer system interface (SCSI), serial attached SCSI (SAS), enhanced small disk interface (ESDI), integrated drive electronics (IDE), or the like. NVM interface 114 may provide an interface between controller 110 and NVM 120. For example, the mapping table MT, write data, and read data may be transmitted and received between controller 110 and NVM 120 through NVM interface 114.

FIG. 6 shows an example embodiment MTa of the mapping table MT of FIG. 5. Referring to FIGS. 5 and 6, a mapping table MTa may include a plurality of snapshot entries 61 to 66. In detail, the mapping table MTa may include snapshot entries 61 and 62 corresponding to the first key K1, snapshot entries 63 to 65 corresponding to the second key K2, and a snapshot entry 66 corresponding to the third key K3. In an embodiment, snapshot entries corresponding to the same key may be implemented as a linked list. In an embodiment, the snapshot entries may each include a snapshot ID, a key, a PPN, and a link region.

For example, snapshot entries 61 and 62 corresponding to the first key K1 may be implemented as a linked list, a link region of snapshot entry 61 may store a storage address ADDR1 of snapshot entry 62 previous to snapshot entry 61 in memory 112, and a link region of snapshot entry 62 may store null NULL denoting that there is no longer linked node. Hereinafter, snapshot entries implemented as a linked list will be described in more detail with reference to FIGS. 7A and 7B.

Figure 7A:
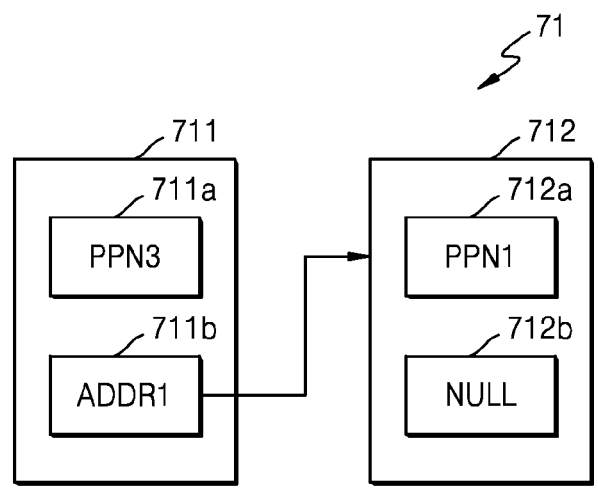
FIG. 7A shows an embodiment of mapping data corresponding to a first key of FIG. 6.

FIG. 7A shows an embodiment of mapping data 71 corresponding to the first key K1 of FIG. 6.

Referring to FIG. 7A, mapping data 71 corresponding to the first key K1 may be implemented as a linked list including first and second nodes 711 and 712. First node 711 may correspond to a snapshot entry 61 which is a latest snapshot entry, and may correspond to a header of the linked list. First node 711 may include a data region 711a and a link region (or a pointer region) 711b. Data region 711a may store a physical address PPN3 corresponding to the first key K1 at a time corresponding to a latest snapshot ID (i.e., the second snapshot ID ID1) for the first key K1. Link region 711b may store an address ADDR1 at which snapshot entry 62 corresponding to a previous snapshot ID (i.e., the first snapshot ID ID0) is stored.

Second node 712 may correspond to snapshot entry 62 which is a previous snapshot entry, and may include a data region 712a and a link region 712b. Data region 712a may store a physical address PPN1 corresponding to the first key K1 at a time corresponding to the first snapshot ID ID0. Since there is no previous snapshot ID generated prior to the first snapshot ID ID0, the link region 712b may store null NULL denoting that there is no longer linked node.

Figure 7B:
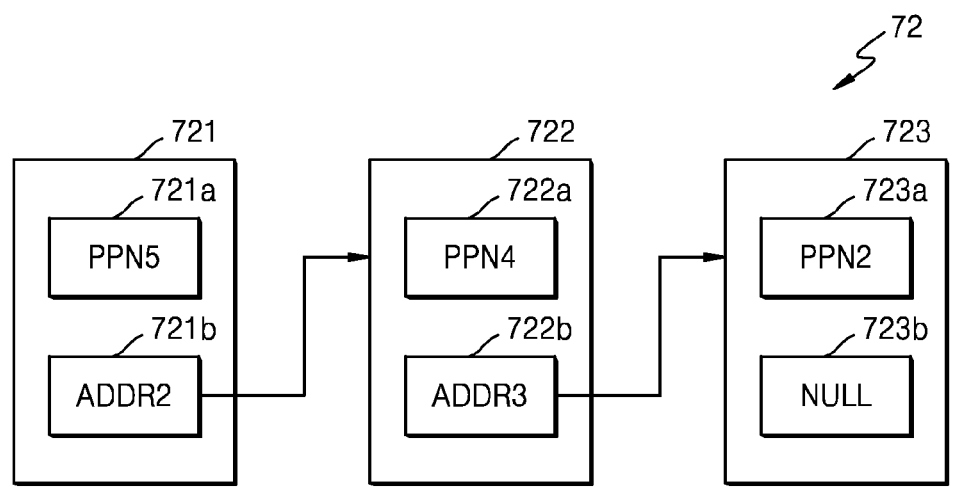
FIG. 7B shows an embodiment of mapping data corresponding to a second key of FIG. 6.

FIG. 7B shows an embodiment of mapping data 72 corresponding to the second key K2 of FIG. 6.

Referring to FIG. 7B, mapping data 72 corresponding to the second key K2 may be implemented as a linked list including first to third nodes 721 to 723. First node 721 may correspond to a snapshot entry 63 which is a latest snapshot entry, and may correspond to a header of the linked list. First node 721 may include a data region 721a and a link region 721b. Data region 721a may store a physical address PPN5 corresponding to the second key K2 at a time corresponding to a latest snapshot ID (i.e., the third snapshot ID ID2) for the second key K2. Link region 721b may store an address ADDR2 at which snapshot entry 64 corresponding to a previous snapshot ID (i.e., the second snapshot ID ID1) is stored.

Second node 722 may correspond to snapshot entry 64 and may include a data region 722a and a link region 722b. Data region 722a may store a physical address PPN4 corresponding to the second key K2 at a time corresponding to the second snapshot ID ID1. Link region 722b may store an address ADDR3 at which snapshot entry 65 corresponding to a previous snapshot ID (i.e., the first snapshot ID ID0) is stored. Third node 723 may correspond to snapshot entry 65 and may include a data region 723a and a link region 723b. Data region 723a may store a physical address PPN2 corresponding to the second key K2 at a time corresponding to the first snapshot ID ID0. Since there is no previous snapshot ID generated prior to the first snapshot ID ID0, link region 723b may store null NULL denoting that there is no longer linked node.

Figure 8:
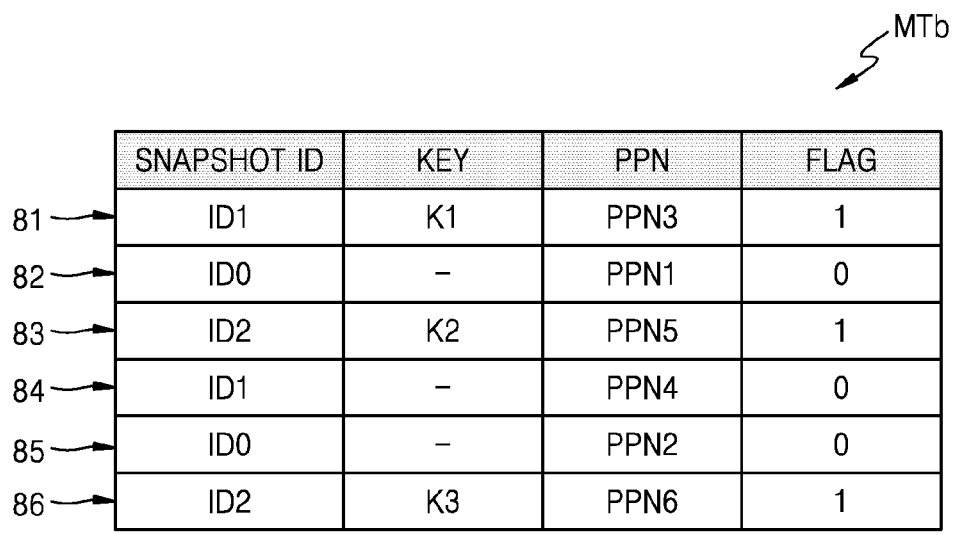
FIG. 8 shows another example embodiment of a mapping table of FIG. 5.

FIG. 8 shows another example embodiment MTb of the mapping table MT of FIG. 5, according to an embodiment.

Referring to FIG. 8, a mapping table MTb may include a plurality of snapshot entries 81 to 86. In detail, the mapping table MTb may include snapshot entries 81 and 82 corresponding to the first key K1, snapshot entries 83 to 85 corresponding to the second key K2, and a snapshot entry 86 corresponding to the third key K3. In an embodiment, the snapshot entries may each include a snapshot ID, a key, a PPN, and a flag. Here, the flag may indicate whether a corresponding snapshot entry corresponds to a latest snapshot entry. If the corresponding snapshot entry is the latest snapshot entry, the flag may have a first flag value (for example, 1), and if the corresponding snapshot entry is not the latest snapshot entry, the flag may have a second flag value (for example, 0).

For example, snapshot entry 81 may correspond to a latest snapshot entry corresponding to the first key K1, and thus, a flag of snapshot entry 81 may have the first flag value. On the other hand, snapshot entry 82 may not correspond to the latest snapshot entry corresponding to the first key K1, and thus, a flag of snapshot entry 82 may have the second flag value. When a normal read request is received from the host, the storage device may check a flag included in the mapping table MTb, search for the latest snapshot entry, based on the checked flag, and perform a read operation, based on the latest snapshot entry.

Figure 9:
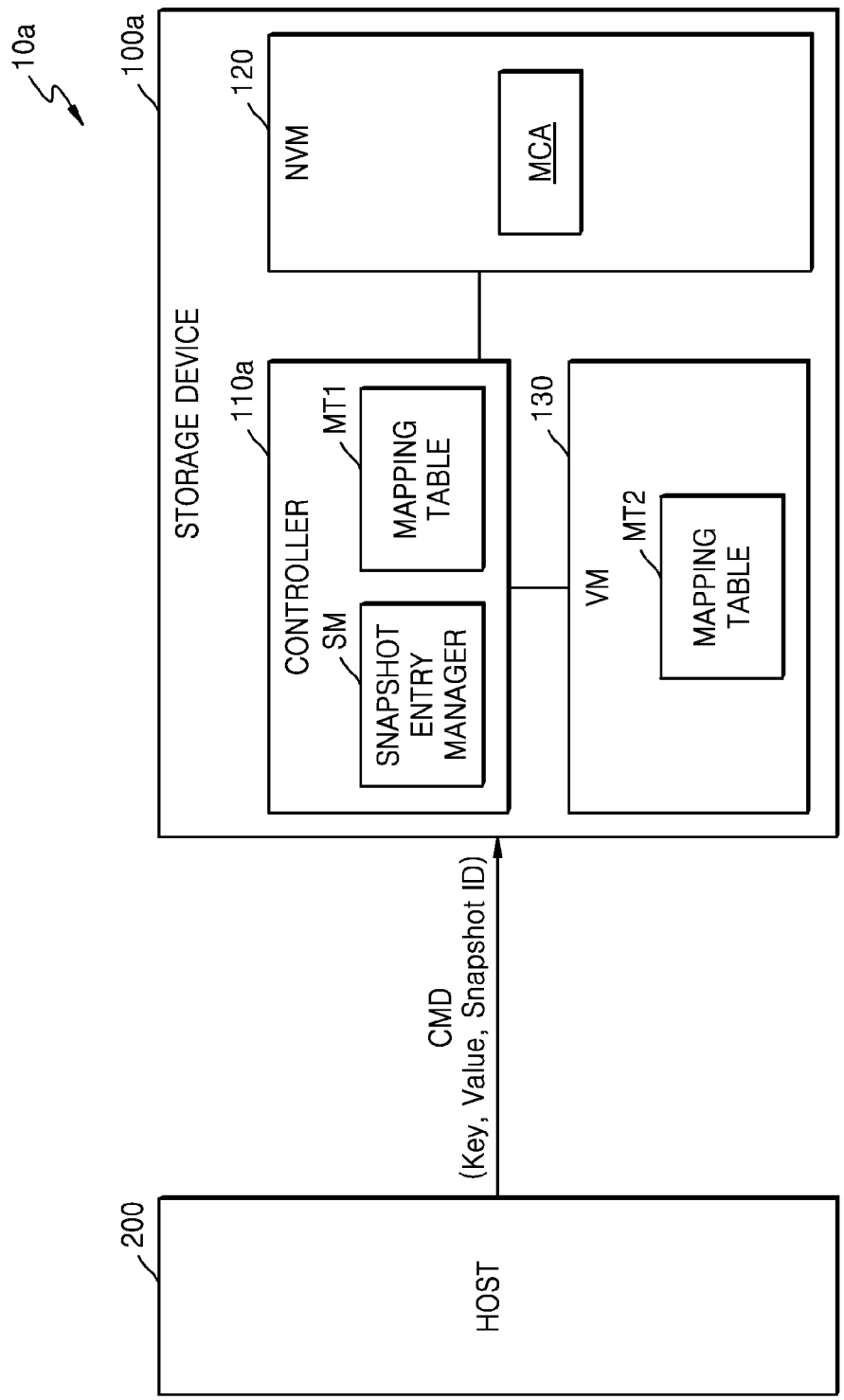
FIG. 9 is a block diagram illustrating an embodiment of a storage system.

FIG. 9 is a block diagram illustrating an embodiment of a storage system 10a. Referring to FIG. 9, storage system 10a may include a storage device 100a and a host 200, and storage device 100a may include a controller 110a, NVM 120, and a volatile memory (VM) 130. Storage device 100a is implemented according to a modified embodiment of storage device 100 of FIG. 1, and a repetitive description is omitted. Controller 110a may include a snapshot entry manger SM and a first mapping table MT1. A second mapping table MT2 may be provided in VM 130, and VM 130 may be disposed outside controller 110a. In an embodiment, the snapshot entry manager SM may store latest snapshot entries of a plurality of snapshot entries in the first mapping table MT1 and may store the other (i.e., older) snapshot entries in the second mapping table MT2.

Figure 10:
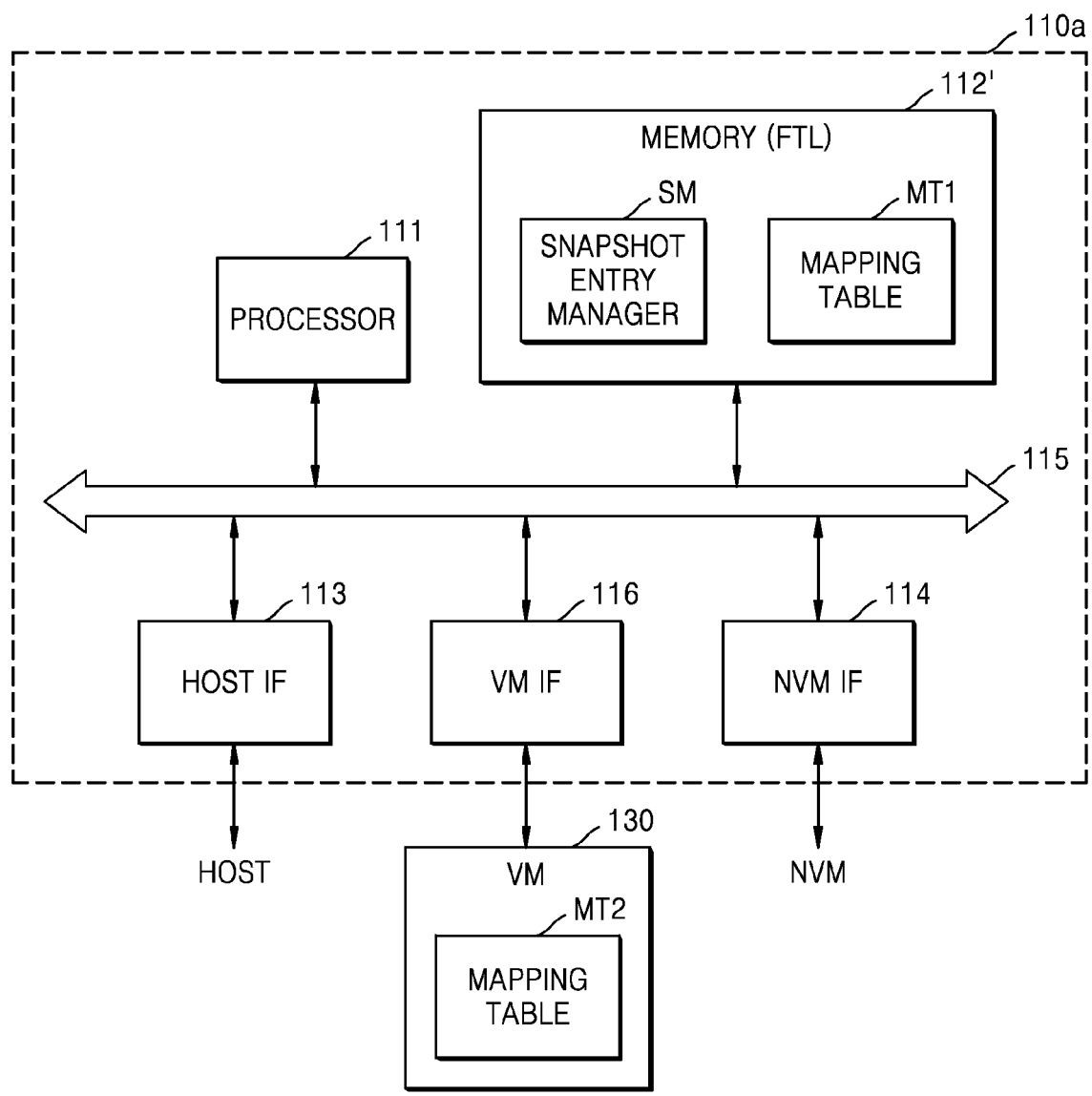
FIG. 10 is a block diagram illustrating an embodiment of a controller of FIG. 9.

FIG. 10 is a block diagram illustrating an embodiment of controller 110a of FIG. 9. Referring to FIG. 10, controller 110a may include processor 111, a memory 112', host interface 113, NVM interface 114, and a VM interface 116, which may communicate with one another through bus 115. In an embodiment, the first mapping table MT1 may be loaded into memory 112', and the second mapping table MT2 may be loaded into VM 130. For example, memory 112' may be SRAM, and VM 130 may be DRAM. Hereinafter, the first and second mapping tables MT1 and MT2 will be described in more detail with reference to FIG. 11.

Figure 11A:
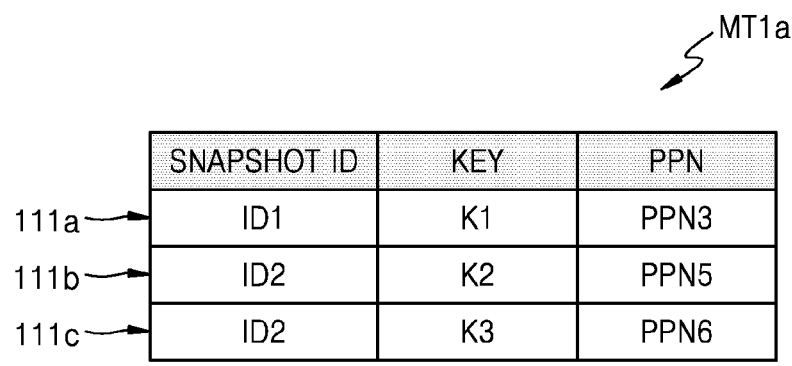
FIG. 11A shows an example embodiment of a first mapping table of FIG. 10.

FIG. 11A shows an example embodiment of MT1a of the first mapping table of FIG. 10. Referring to FIGS. 9 and 11A, a first mapping table MT1a may store latest snapshot entries 111a to 111c respectively corresponding to a plurality of keys K1 to K3. The first mapping table MT1a may be loaded into memory 112' (for example, SRAM) included in controller 110a, and thus, may quickly perform a read operation in response to a normal read request. For example, when a normal read request including a first key K1 is received from host 200, storage device 100a may search the first mapping table MT1a to find a latest snapshot entry 111a corresponding to the first key K1 and may perform a read operation on NVM 120, based on a physical address PPN3 included in latest snapshot entry 111a.

Figure 11B:
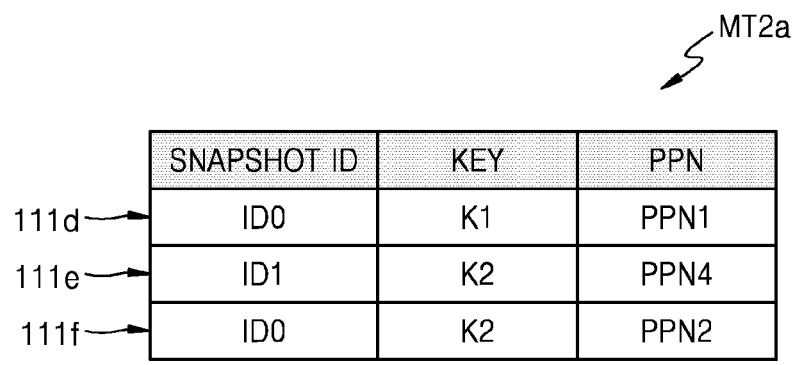
FIG. 11B shows an example embodiment of a second mapping table of FIG. 10.

FIG. 11B shows an example embodiment of MT2a of the second mapping table of FIG. 10. Referring to FIG. 11B, a second mapping table MT2a may store snapshot entries 111d to 111f respectively corresponding to a plurality of keys K1 to K3. For example, when a snapshot read request including a first key K1 and a first snapshot ID ID0 is received from host 200, storage device 100a may search the second mapping table MT2a to find a snapshot entry 111d corresponding to the first key K1 and the first snapshot ID ID0 and may perform a read operation on NVM 120, based on a physical address PPN1 included in snapshot entry 111d.

Figure 12:
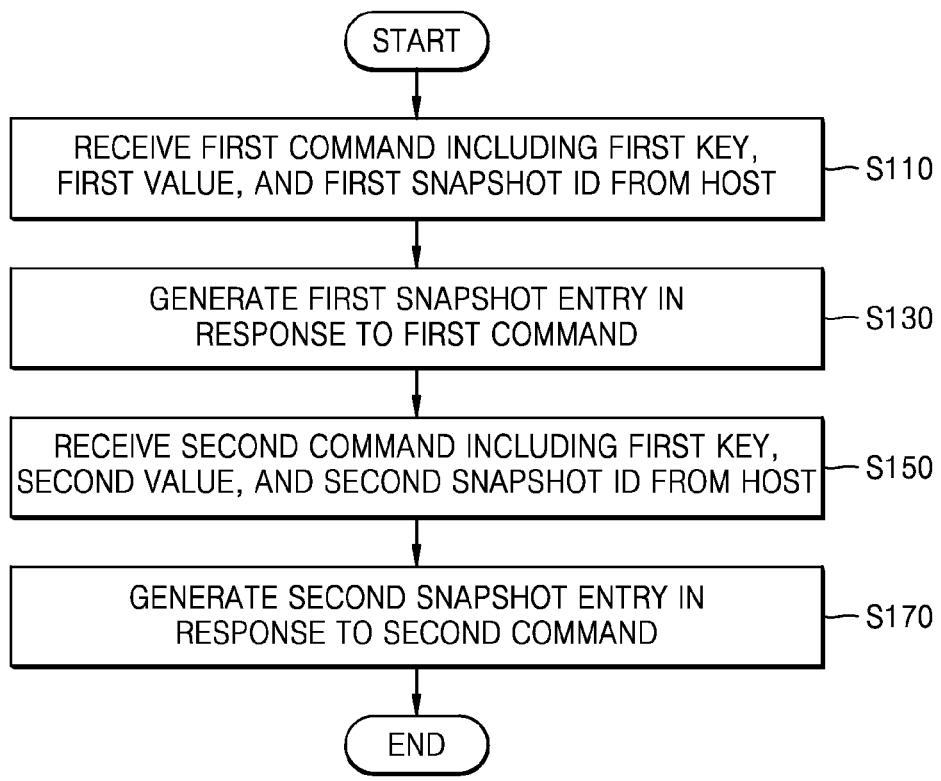
FIG. 12 is a flowchart illustrating an embodiment of an operating method of a storage device.

FIG. 12 is a flowchart illustrating an embodiment of an operating method of a storage device. Referring to FIG. 12, the operating method of the storage device according to the present embodiment may correspond to a method of generating a snapshot entry so as to support the snapshot function in the storage device. For example, the operating method according to the present embodiment may be time-serially performed in storage device 100 of FIG. 1 or storage device 100a of FIG. 9. Details described above with reference to FIGS. 1 to 11B may be applied to the present embodiment.

In operation S110, the storage device may receive a first command including a first key, a first value, and a first snapshot ID from a host. In operation S130, the storage device may generate a first snapshot entry in response to the received first command In an embodiment, the first snapshot entry may include the first snapshot ID, the first key, and a first physical address, and the first physical address may correspond to a PPN, in which the first value is written, in NVM 120. For example, a snapshot entry manager SM may generate the first snapshot entry and may store the generated first snapshot entry in a mapping table MT.

In operation S150, the storage device may receive a second command including a first key, a second value, and a second snapshot ID from the host. Before operation S150, the host may generate a second snapshot ID. In operation S170, the storage device may generate a second snapshot entry in response to the received second command In an embodiment, the second snapshot entry may include the second snapshot ID, the first key, and a second physical address, and the second physical address may correspond to a PPN, in which the second value is written, in NVM 120. For example, the snapshot entry manager SM may generate the second snapshot entry and may store the generated second snapshot entry in the mapping table MT.

Figure 13:
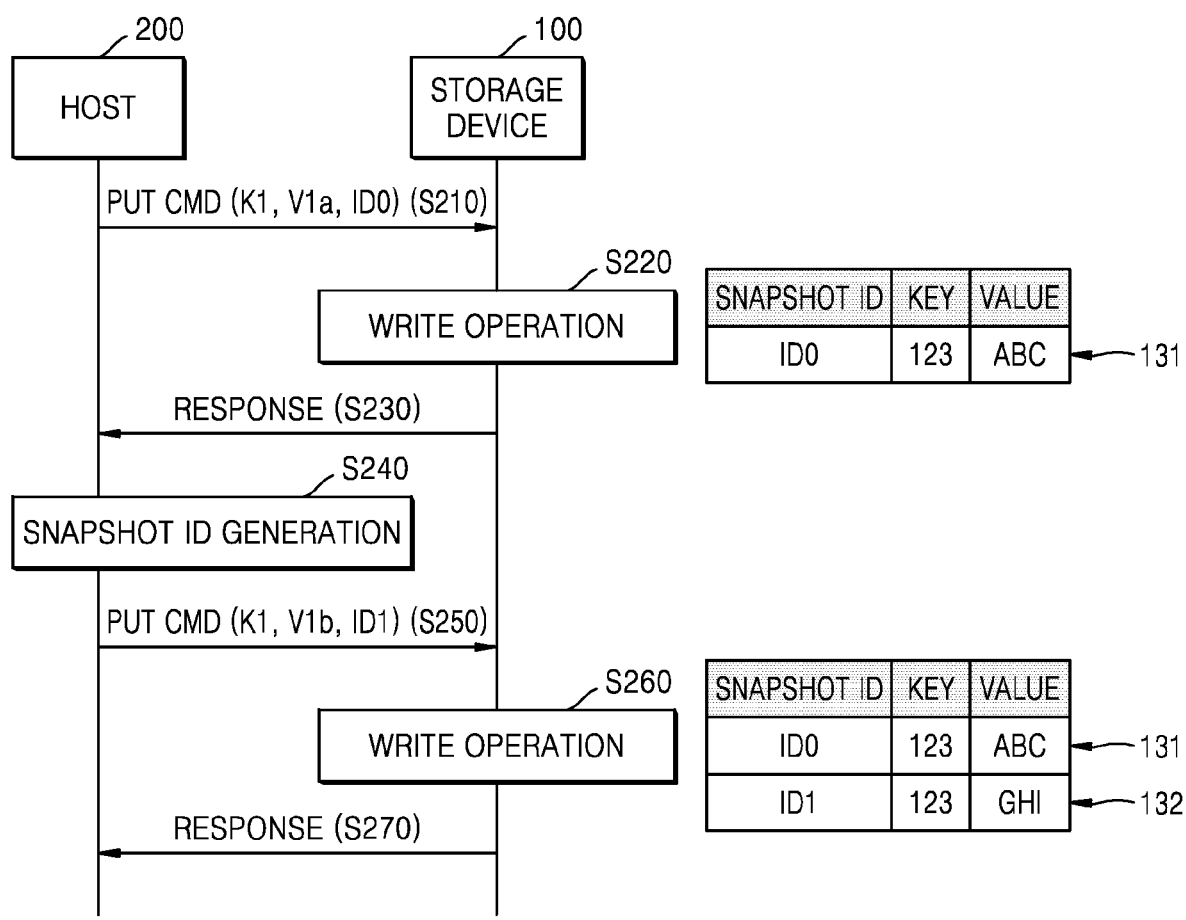
FIG. 13 is a flowchart illustrating an embodiment of an operation between a host and a storage device.

FIG. 13 is a flowchart illustrating an embodiment of an operation between host 200 and storage device 100. An operation between host 200 and storage device 100 according to the present embodiment may correspond to an implementation example of FIG. 12.

Referring to FIG. 13, in operation S210, host 200 may transmit a first tuple 131 including a first key K1 and a first value V1a and a first command (for example, a put command) including a first snapshot ID ID0 to storage device 100. At this time, the first snapshot ID ID0 may be allocated to first tuple 131. In operation S220, storage device 100 may perform a write operation on first tuple 131. For example, the first key K1 may be '123', and the first value V1a may be 'ABC'. In operation S230, storage device 100 may transmit a response message to host 200, representing completion of a write operation on the first tuple 131. In some embodiments, between operation S210 and S220, the host 200 may transmit a second tuple including a second key and a command including a first snapshot ID to the storage device 100. In this case, the storage device 100 may sequentially perform write operations on the first and second tuples, and subsequently, may transmit response messages to host 200, representing completion of the write operations on the first and second tuples.

In operation S240, host 200 may generate a second snapshot ID ID1. In operation S250, host 200 may transmit a second tuple 132 including the first key K1 and a second value V1b and a second command (for example, a put command) including a second snapshot ID ID1 to storage device 100. At this time, the second snapshot ID ID1 may be allocated to second tuple 132. In operation S260, storage device 100 may perform a write operation on second tuple 132. For example, the second value V1b may be 'GHI'. In operation S270, storage device 100 may transmit a response message to host 200, representing completion of a write operation on second tuple 132.

Figure 14:
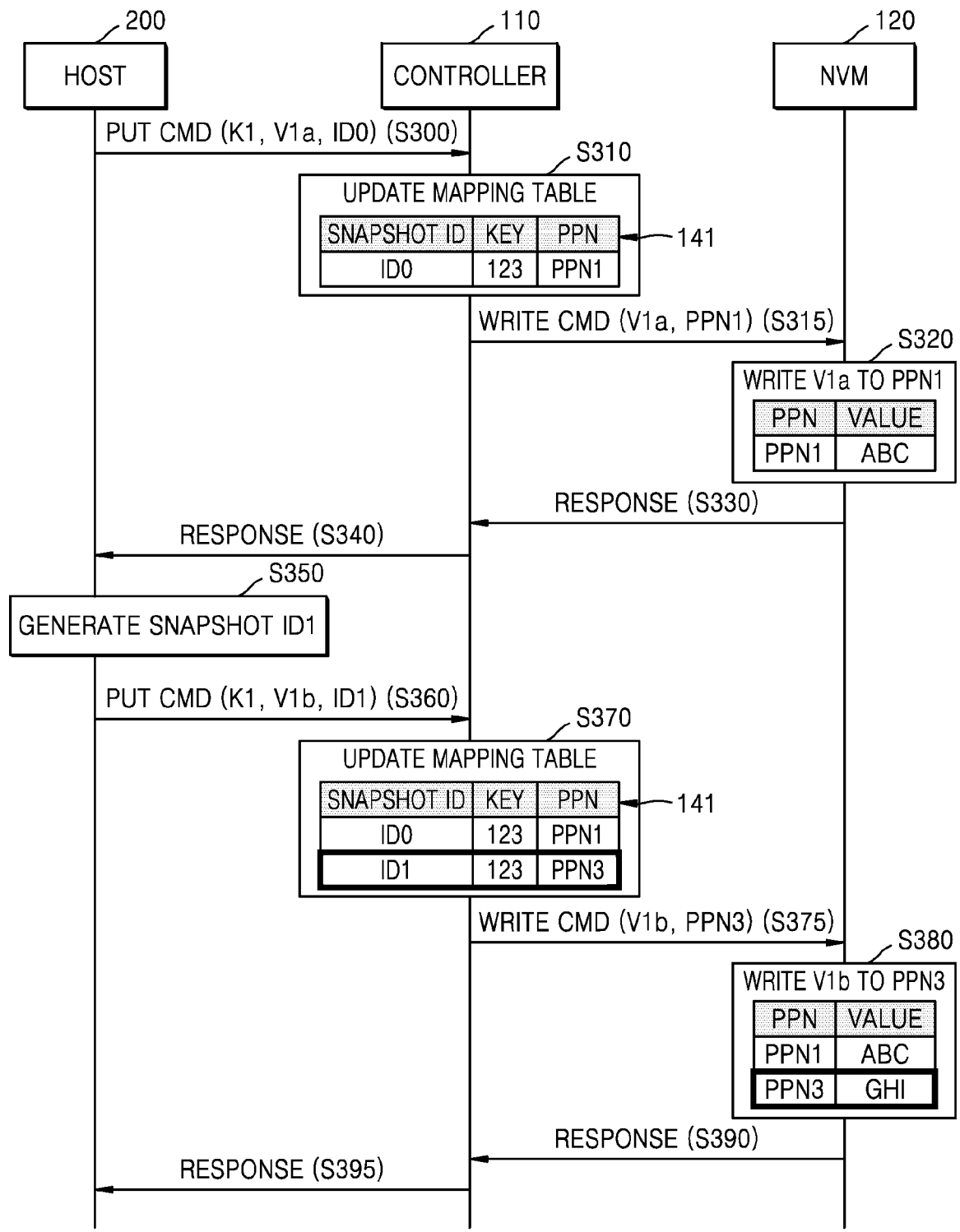
FIG. 14 is a flowchart illustrating an embodiment of an operation between a host, a controller, and a non-volatile memory.

FIG. 14 is a flowchart illustrating an embodiment of an operation between host 200, controller 110, and NVM 120. The operation between host 200, controller 110, and NVM 120 according to the present embodiment may correspond to an implementation example of FIG. 13. Hereinafter, the operation according to the present embodiment will be described with reference to FIGS. 1 and 14.

In operation S300, host 200 may transmit a first command (for example, a put command) including a first key K1, a first value V1a, and a first snapshot ID ID0 to controller 110. In operation S310, controller 110 may update a mapping table 141. In detail, controller 110 may generate a first snapshot entry including the first snapshot ID ID0, the first key K1 (for example, '123'), and a first physical address (for example, PPN1) and may store the generated first snapshot entry in mapping table 141.

In operation S315, controller 110 may transmit a write command including the first value V1a and the first physical address PPN1 to the NVM 120. In operation S320, NVM 120 may write the first value V1a (for example, 'ABC') in the first physical address PPN1. In operation S330, NVM 120 may transmit a response message, representing completion of a write operation on the first value V1a, to controller 110. In operation S340, controller 110 may transmit a response message to host 200, representing that writing of the first key K1 and the first value V1a is completed.

In operation S350, host 200 may generate a second snapshot ID ID1. In operation S360, host 200 may transmit a command (for example, a put command) including the first key K1, a second value V1b, and a second snapshot ID ID1 to controller 110. In operation S370, controller 110 may update mapping table 141. In detail, controller 110 may generate a second snapshot entry including the second snapshot ID ID1, the first key K1, and a second physical address (for example, PPN3) and may store the generated second snapshot entry in mapping table 141.

In operation S375, controller 110 may transmit a write command including the second value V1b and the second physical address PPN3 to NVM 120. In operation S380, NVM 120 may write the second value V1b (for example, 'GHI') at the second physical address PPN3. In operation S390, NVM 120 may transmit a response message, representing completion of a write operation on the second value V1b, to controller 110. In operation S395, controller 110 may transmit a response message to host 200, representing completion of a write operation on the first key K1 and the second value V1b.

Figure 15:
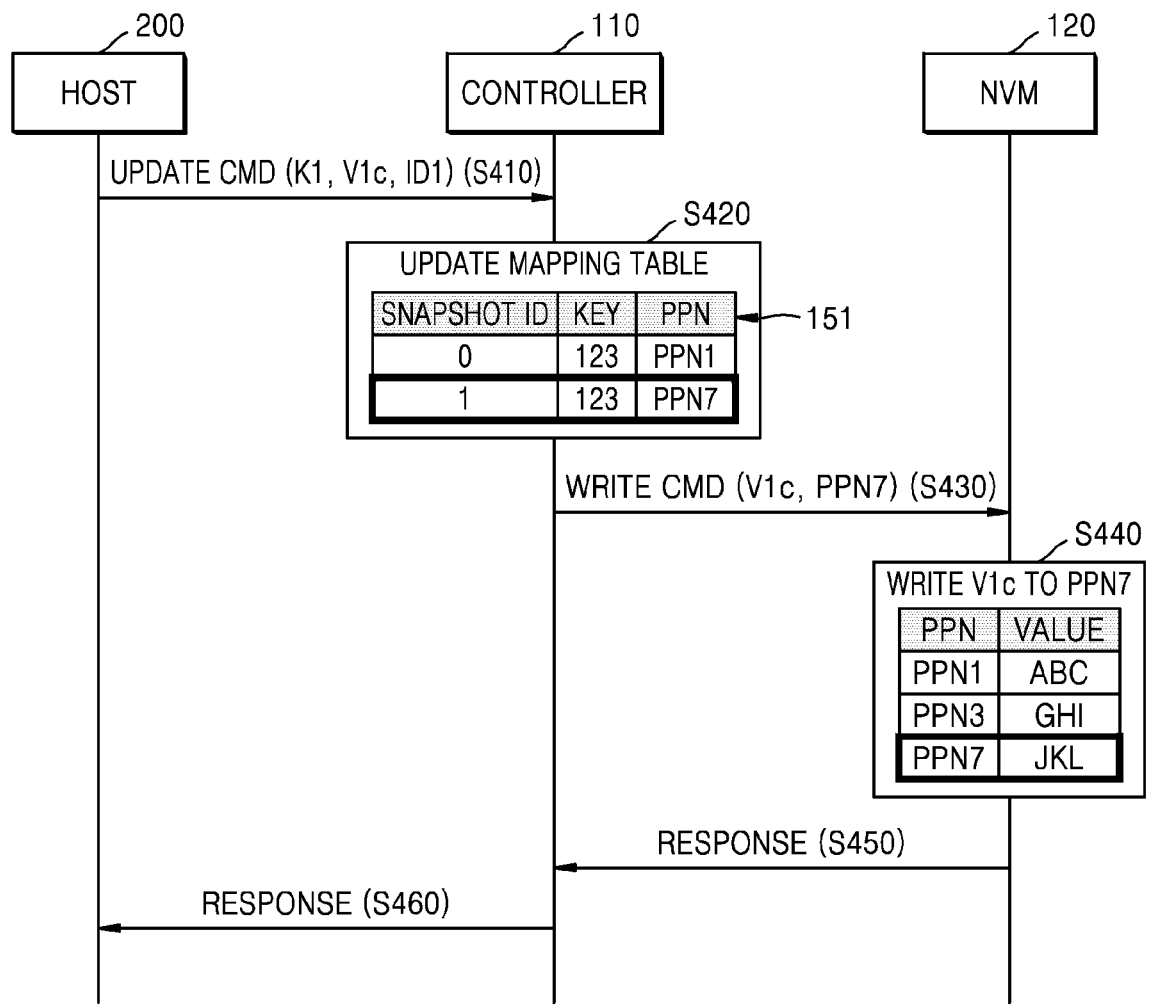
FIGS. 15 and 16 are flowcharts illustrating an embodiment of an operation between a host and a storage device.

FIG. 15 is a flowchart illustrating an embodiment of an operation between host 200 and storage device 100. The operation between host 200 and storage device 100 according to the present embodiment may be performed after operation S395 of FIG. 14. In an embodiment, storage device 100 may support a read/write snapshot function capable of updating of a snapshot entry.

Referring to FIG. 15, in operation S410, host 200 may transmit a command (for example, an update command) including a first key K1, a third value V1c, and a second snapshot ID ID1 to storage device 100. In operation S420, controller 110 may perform an update by using a mapping table 151. In detail, a snapshot entry manager SM may correct the second snapshot entry, included in mapping table 141 of FIG. 14, to a second snapshot entry obtained through the update to update mapping table 141 of FIG. 14 to mapping table 151. The second snapshot entry obtained through the update may include a second snapshot ID ID1, a first key K1, and a third physical address (for example, PPN7).

In operation S430, controller 110 may transmit a write command including the third value V1c and the third physical address PPN7 to NVM 120. In operation S440, NVM 120 may write the third value V1c (for example, 'JKL') at the third physical address PPN7. In operation S450, NVM 120 may transmit a response message, representing completion of a write operation on the third value V1c, to controller 110. In operation S460, controller 110 may transmit a response message to host 200, representing completion of a write operation on the first key K1 and the third value V1c.

Figure 16:
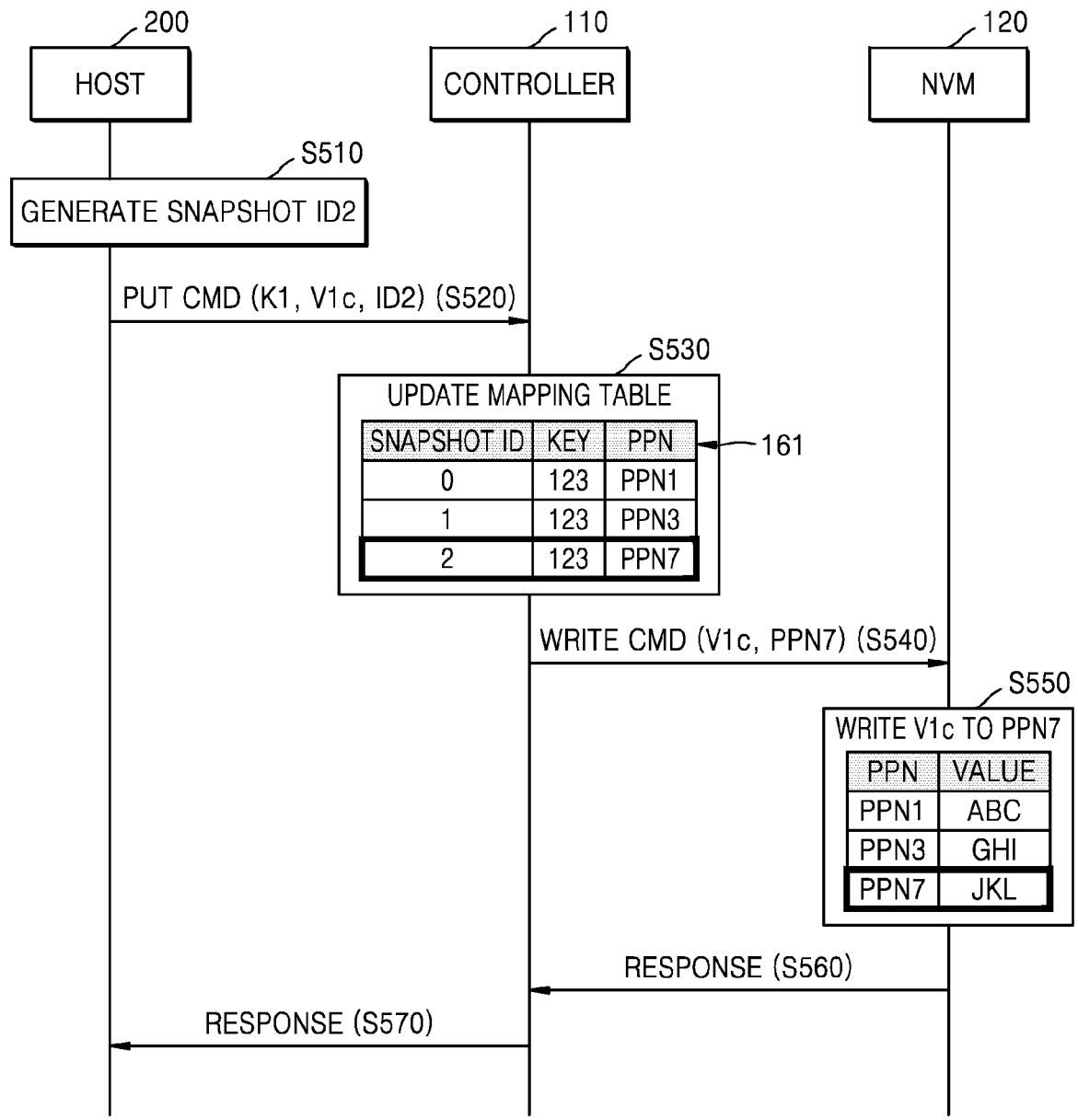

FIG. 16 is a flowchart illustrating an embodiment of an operation between host 200 and storage device 100. The operation between host 200 and storage device 100 according to the present embodiment may be performed after operation S395 of FIG. 14. In an embodiment, storage device 100 may support a read-only snapshot function incapable of updating of a snapshot entry.

Referring to FIG. 16, in operation S510, host 200 may generate a third snapshot ID ID2. In operation S520, host 200 may transmit a command (for example, a put command) including a first key K1, a third value V1c, and the third snapshot ID ID2 to controller 110. In operation S530, controller 110 may perform an update by using a mapping table 161. In detail, a snapshot entry manager SM may generate a third snapshot entry including the third snapshot ID ID2, the first key K1, and a third physical address (for example, PPN7) and may store the generated third snapshot entry in mapping table 161.

In operation S540, controller 110 may transmit a write command including the third value V1c and the third physical address PPN7 to NVM 120. In operation S550, NVM 120 may write the third value V1c (for example, 'JKL') at the third physical address PPN7. In operation S560, NVM 120 may transmit a response message, representing completion of a write operation on the third value V1c, to controller 110. In operation S570, controller 110 may transmit a response message to host 200, representing completion of a write operation on the first key K1 and the third value V1c.

Figure 17:
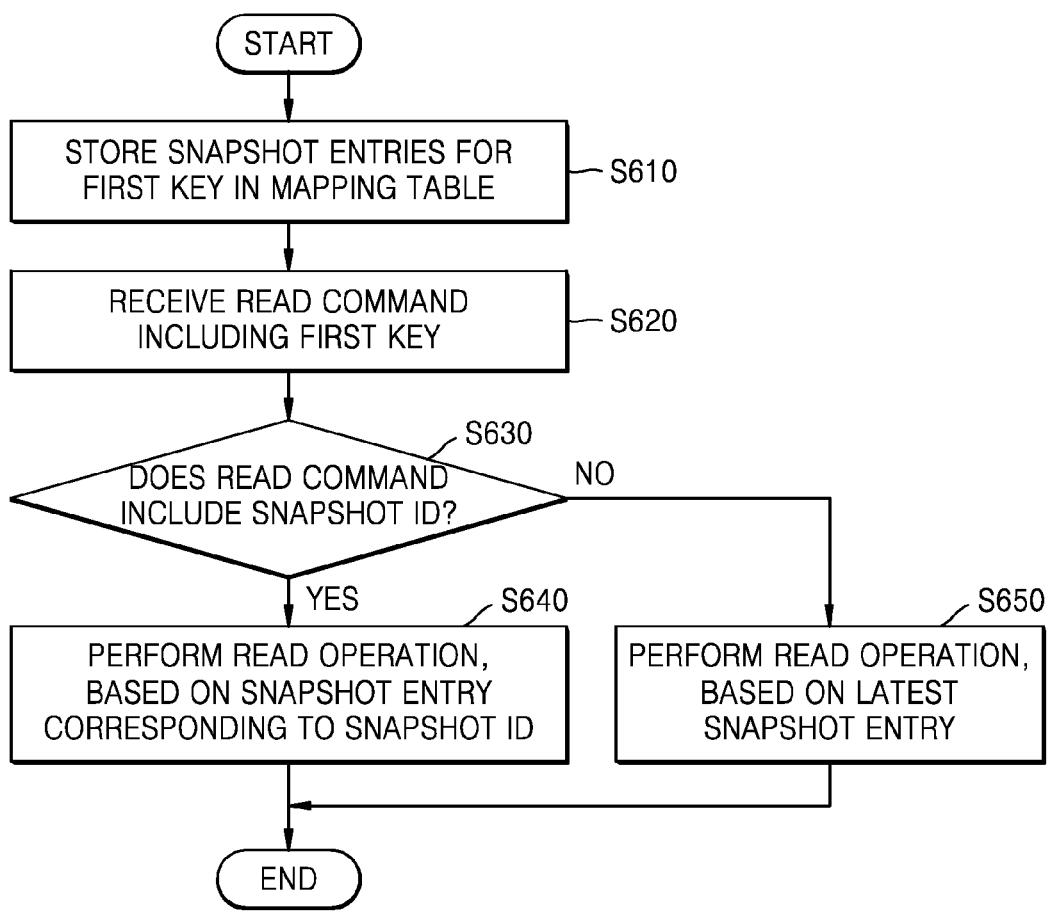
FIG. 17 is a flowchart illustrating an embodiment of an operating method of a storage device.

FIG. 17 is a flowchart illustrating an embodiment of an operating method of a storage device. Referring to FIG. 17, the operating method of the storage device according to the present embodiment may correspond to a value reading method of the storage device supporting the snapshot function. For example, the operating method according to the present embodiment may be time-serially performed in storage device 100 of FIG. 1 or storage device 100a of FIG. 9. The details described above with reference to FIGS. 1 to 11B may be applied to the present embodiment.

In operation S610, the storage device may store a plurality of snapshot entries corresponding to a first key in a mapping table. In operation S620, the storage device may receive a read command including the first key from a host. In operation S630, the storage device may determine whether the read command includes a snapshot ID. When it is determined as a result of the determination that the read command includes the snapshot ID, operation S640 may be performed. When it is determined that the read command does not include the snapshot ID, operation S650 may be performed. In operation S640, a read operation may be performed based on a snapshot entry corresponding to the snapshot ID, and operation S640 may be referred to as a snapshot read operation. In operation S650, a read operation may be performed based on a latest snapshot entry, and operation S650 may be referred to as a normal read operation.

Figure 18:
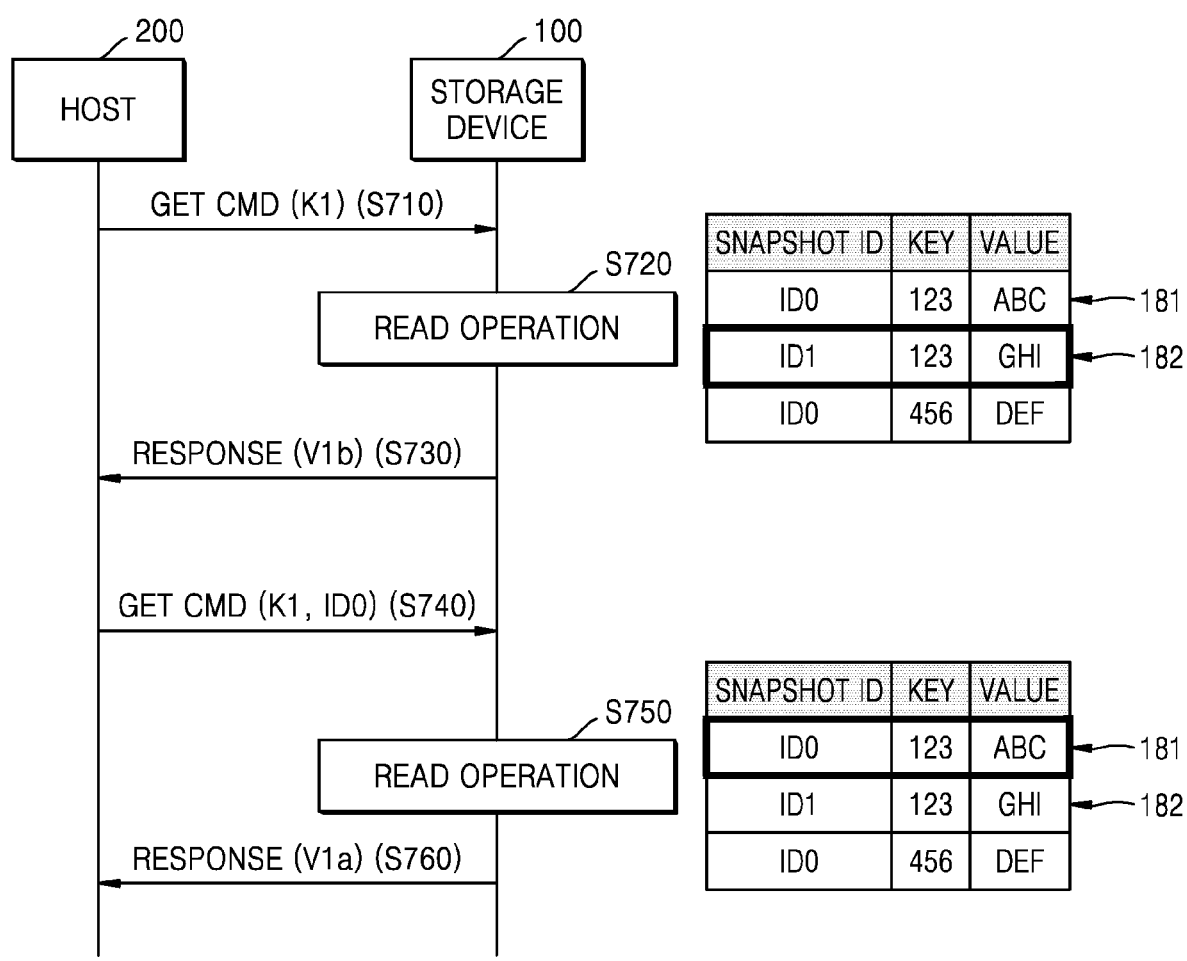
FIG. 18 is a flowchart illustrating an embodiment of an operation between a host and a storage device.

FIG. 18 is a flowchart illustrating an embodiment of an operation between host 200 and storage device 100. The operation between host 200 and storage device 100 according to the present embodiment may correspond to an implementation example of FIG. 17.

Referring to FIG. 18, in operation S710, host 200 may transmit a first command (for example, a get command) including a first key K1 to storage device 100. Since the first command does not include a snapshot ID, the first command may correspond to a normal read request. In operation S720, storage device 100 may perform a read operation on a value corresponding to the first key K1. In detail, storage device 100 may read a second value V1b (for example, GHI) included in a second tuple 182, corresponding to a latest snapshot ID, of a plurality of tuples 181 and 182 for the first key K1. In operation S730, storage device 100 may transmit a response message to host 200, including the second value V1b.

In operation S740, host 200 may transmit a second command (for example, a get command) including the first key K1 and a first snapshot ID ID0 to storage device 100. Since the second command includes the snapshot ID, the second command may correspond to a snapshot read request. In operation S750, storage device 100 may perform a read operation on a value corresponding to the first key K1. In detail, storage device 100 may read a first value V1a (for example, ABC) included in a first tuple 181, corresponding to the first snapshot ID ID0, of the plurality of tuples 181 and 182 for the first key K1. In operation S760, storage device 100 may transmit a response message to host 200, including the first value V1a.

Figure 19:
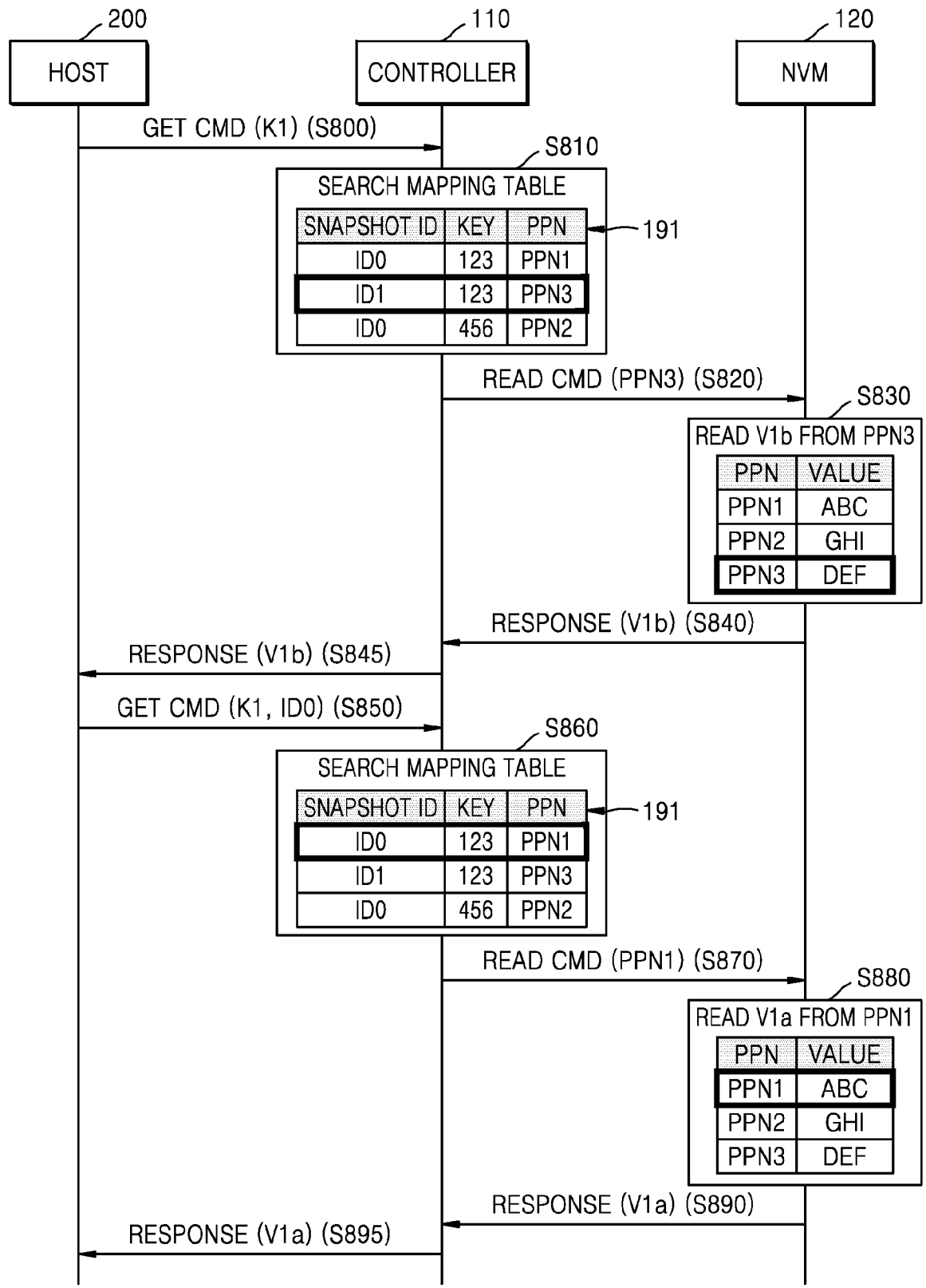
FIG. 19 is a flowchart illustrating an embodiment of an operation between a host, a controller, and a non-volatile memory.

FIG. 19 is a flowchart illustrating an embodiment of an operation between host 200, controller 110, and NVM 120. The operation between host 200, controller 110, and NVM 120 according to the present embodiment may correspond to an implementation example of FIG. 18. Hereinafter, the operation according to the present embodiment will be described with reference to FIGS. 1 and 19.

In operation S800, host 200 may transmit a first read command (for example, a get command) including a first key K1 to controller 110. In operation S810, controller 110 may search a mapping table 191. In detail, controller 110 may search for a plurality of snapshot entries corresponding to the first key K1 to find a second snapshot entry, corresponding to a second snapshot ID ID1 which is a latest snapshot ID, of the plurality of snapshot entries. Controller 110 may determine a physical address PPN3 for which a read operation is to be performed, based on the second snapshot entry.

In operation S820, controller 110 may transmit a read command including the physical address PPN3 to NVM 120. In operation S830, NVM 120 may read the second value V1b (for example, 'DEF') stored at the physical address PPN3. In operation S840, NVM 120 may transmit a response message including the second value V1b to controller 110. In operation S845, controller 110 may transmit the response message to host 200, including the second value V1b.

In operation S850, host 200 may transmit a second read command (for example, a get command) including the first key K1 and a first snapshot ID ID0 to controller 110. In operation S860, controller 110 may search mapping table 191. In detail, controller 110 may search for the plurality of snapshot entries corresponding to the first key K1 to find a first snapshot entry, corresponding to the first snapshot ID ID0, of the plurality of snapshot entries. Controller 110 may determine a physical address PPN1 for which a read operation is to be performed, based on the first snapshot entry.

In operation S870, controller 110 may transmit a read command including the physical address PPN1 to NVM 120. In operation S880, NVM 120 may read the first value V1a (for example, 'ABC') stored at the physical address PPN1. In operation S890, NVM 120 may transmit a response message including the first value V1a to controller 110. In operation S895, controller 110 may transmit the response message to host 200, including the first value V1a to host 200.

Figure 20:
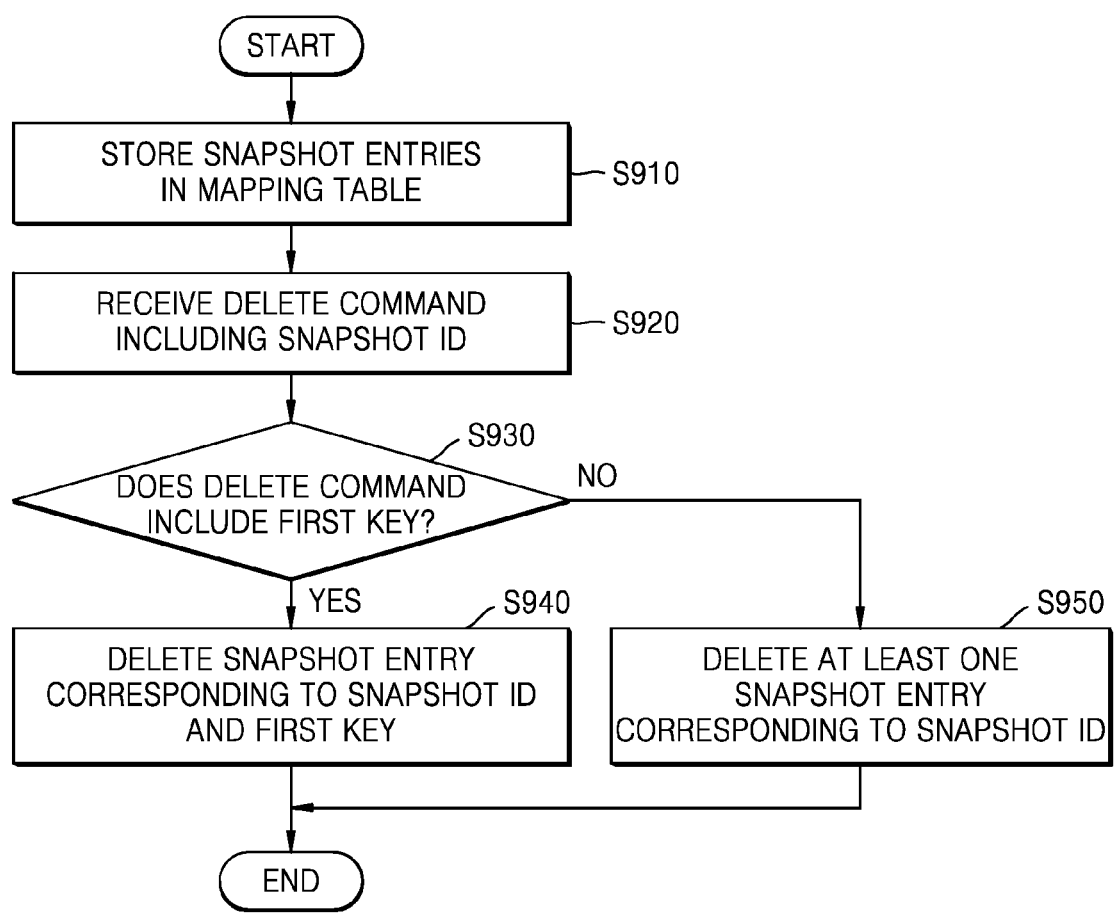
FIG. 20 is a flowchart illustrating an embodiment of an operating method of a storage device.

FIG. 20 is a flowchart illustrating an embodiment of an operating method of a storage device. Referring to FIG. 20, the operating method of the storage device according to the present embodiment may correspond to a snapshot entry deleting method of the storage device supporting the snapshot function. For example, the operating method according to the present embodiment may be time-serially performed in storage device 100 of FIG. 1 or storage device 100a of FIG. 9. The details described above with reference to FIGS. 1 to 11B may be applied to the present embodiment.

In operation S910, the storage device may store a plurality of snapshot entries in a mapping table. In operation S920, the storage device may receive a delete command including the snapshot ID from a host. In operation S930, the storage device may determine whether the delete command includes a first key. In this case, the first key may correspond to an arbitrary key included in at least one of the plurality of snapshot entries stored in the mapping table. When it is determined that the delete command includes the first key as a result of the determination, operation S940 may be performed. When it is determined that the delete command does not include the first key, operation S950 may be performed. In operation S940, the storage device may delete a snapshot entry corresponding to the snapshot ID and the first key. In operation S950, the storage device may delete at least one snapshot entry corresponding to the snapshot ID.

Figure 21:
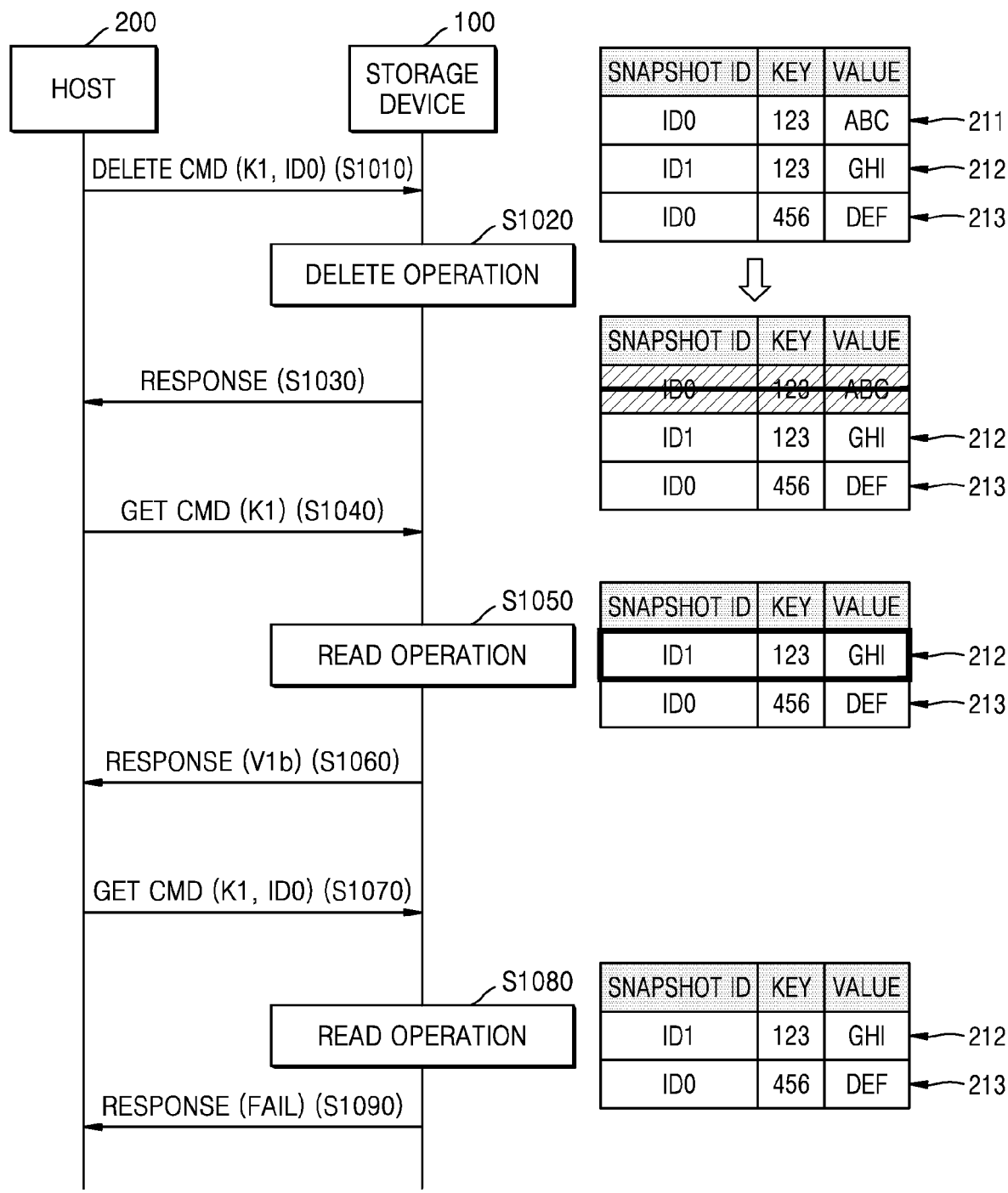
FIG. 21 is a flowchart illustrating an embodiment of an operation between a host and a storage device.

FIG. 21 is a flowchart illustrating an embodiment of an operation between host 200 and storage device 100. The operation between host 200 and storage device 100 according to the present embodiment may correspond to an implementation example of FIG. 20.

Referring to FIG. 21, in operation S1010, host 200 may transmit a delete command including a first key K1 and a first snapshot ID ID0 to storage device 100. In operation S1020, storage device 100 may delete a snapshot entry corresponding to the first key K1 and the first snapshot ID ID0 from among a plurality of snapshot entries stored in a mapping table. In detail, storage device 100 may delete a first tuple 211 corresponding to the first snapshot ID ID0 from among first tuple 211 and second tuple 212 corresponding to the first key K1. In operation S1030, storage device 100 may transmit a response message to host 200, representing completion of the deletion of the snapshot entry.

In operation S1040, host 200 may transmit a first read command (for example, a get command) including the first key K1 to storage device 100. In operation S1050, storage device 100 may perform a read operation on a value corresponding to the first key K1. In detail, storage device 100 may read a second value V1b (for example, GHI) included in second tuple 212 for the first key K1. In operation S1060, storage device 100 may transmit a response message to host 200, including the second value V1b.

In operation S1070, host 200 may transmit a second read command (for example, a get command) including the first key K1 and the first snapshot ID ID0 to storage device 100. In operation S1080, storage device 100 may perform a read operation on a value corresponding to the first key K1 and the first snapshot ID ID0. However, since first tuple 211 corresponding to the first key K1 and the first snapshot ID ID0 is deleted in operation S1020, storage device 100 fails in the read operation. In operation S1090, storage device 100 may transmit a response message representing a read fail to host 200.

Figure 22:
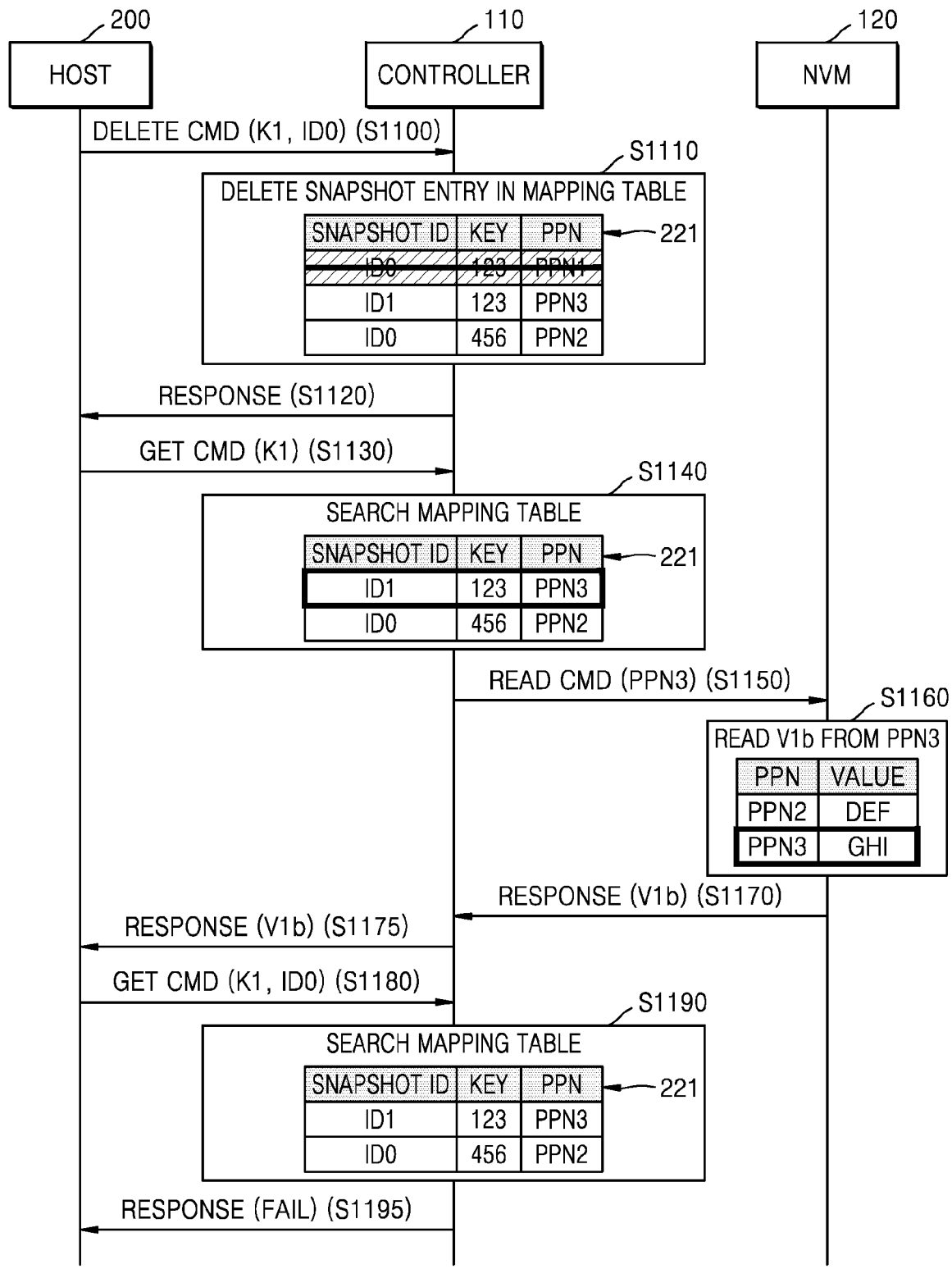
FIG. 22 is a flowchart illustrating an embodiment of an operation between a host, a controller, and a non-volatile memory.

FIG. 22 is a flowchart illustrating an embodiment of an operation between host 200, controller 110, and NVM 120. The operation between host 200, controller 110, and NVM 120 according to the present embodiment may correspond to an implementation example of FIG. 21. Hereinafter, the operation according to the present embodiment will be described with reference to FIGS. 1 and 22.

In operation S1100, host 200 may transmit a delete command including a first key K1 and a first snapshot ID ID0 to controller 110. In operation S1110, controller 110 may delete a snapshot entry corresponding to the first key K1 and the first snapshot ID ID0 in a mapping table 221. In operation S1120, controller 110 may transmit a response message to host 200, representing completion of the deletion of the snapshot entry.

In operation S1130, host 200 may transmit a first read command (for example, a get command) including the first key K1 to controller 110. In operation S1140, controller 110 may search mapping table 221. In detail, controller 110 may find a snapshot entry corresponding to the first key K1 and may determine a physical address, for which a read operation is to be performed, as PPN3, based on the snapshot entry.

In operation S1150, controller 110 may transmit a read command including the PPN3 to NVM 120. In operation S1160, NVM 120 may read a second value V1b (for example, 'GHI') stored in the PPN3. In operation S1170, NVM 120 may transmit a response message including the second value V1b to controller 110. In operation S1175, controller 110 may transmit the response message to host 200, including the second value V1b.

In operation S1180, host 200 may transmit a second read command (for example, a get command) including the first key K1 and the first snapshot ID ID0 to controller 110. In operation S1190, controller 110 may search mapping table 221. However, since the snapshot entry corresponding to the first key K1 and the first snapshot ID ID0 is deleted in operation S1110, controller 110 cannot find a corresponding snapshot entry. In operation S1195, controller 110 may transmit a response message to host 200, representing a read fail.

Figure 23:
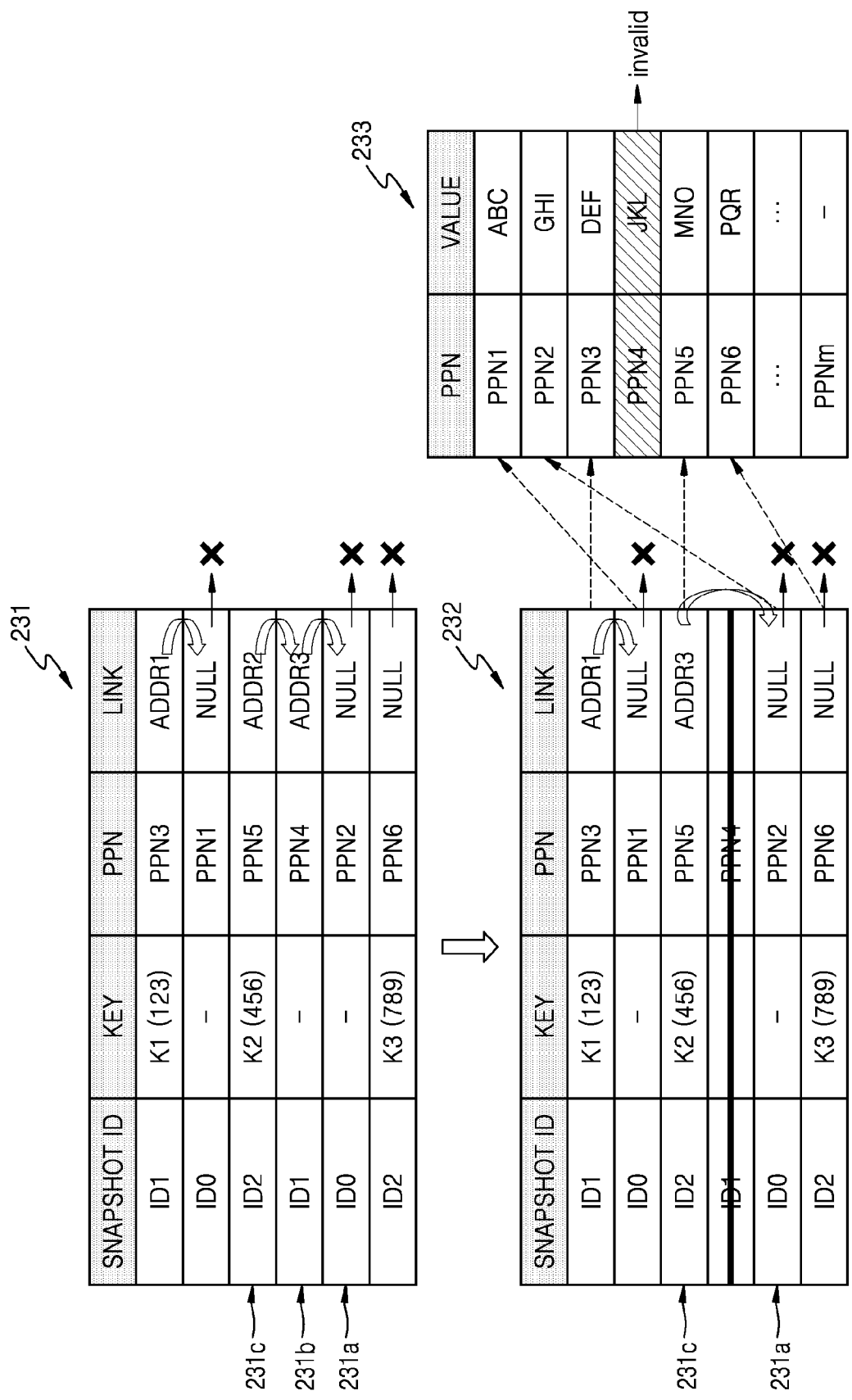
FIG. 23 illustrates an embodiment of a snapshot entry deleting operation.

FIG. 23 illustrates an embodiment of a snapshot entry deleting operation. The snapshot entry deleting operation according to the present embodiment may correspond to a modified example of operation S1110 of FIG. 22. Hereinafter, the snapshot entry deleting operation according to the present embodiment will be described with reference to FIGS. 22 and 23.

A K2P mapping table 231 may include a plurality of snapshot entries, and snapshot entries corresponding to the same key may be implemented as a linked list. For example, first to third snapshot entries 231a to 231c corresponding to a second key K2 may be implemented as a linked list, a storage address ADDR2 of second snapshot entry 231b may be stored in a link region of third snapshot entry 231c, and a storage address ADDR3 of first snapshot entry 231a may be stored in a link region of second snapshot entry 231b.

In response to a delete command including the second key K2 and a second snapshot ID ID1, storage device 100 may delete second snapshot entry 231b corresponding to the second key K2 and the second snapshot ID ID1 in K2P mapping table 231, and thus, may correct K2P mapping table 231 by using an updated K2P mapping table 232. In detail, storage device 100 may correct the storage address ADDR2, stored in a link region of third snapshot entry 231c, to the storage address ADDR3 of first snapshot entry 231a, and thus, third snapshot entry 231c may be linked to first snapshot entry 231a. In this manner, since second snapshot entry 231b is deleted, a value (for example, 'JKL') stored at a physical address PPN4 may become invalid data in NVM 233.

Figure 24:
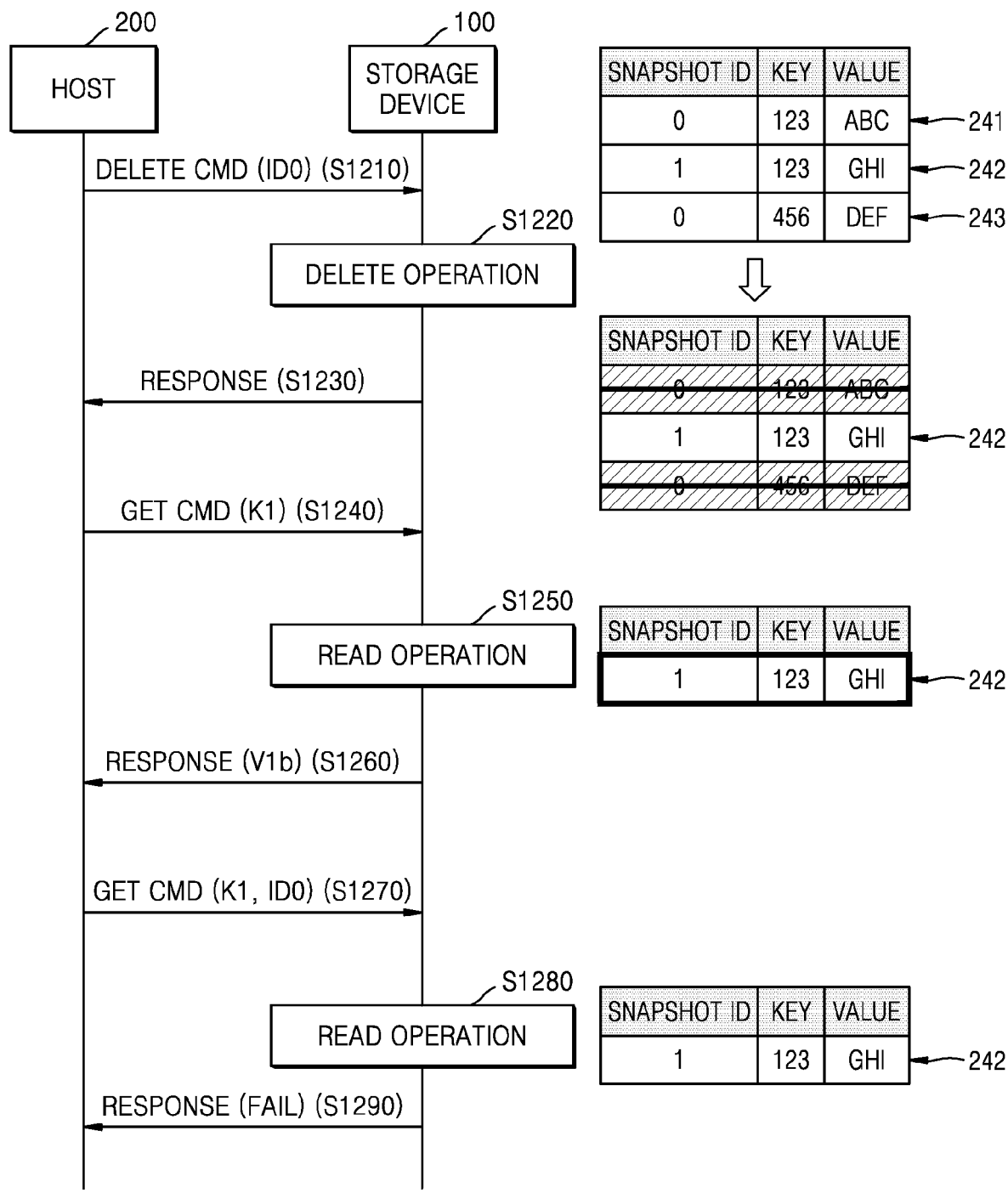
FIGS. 24 and 25 are flowcharts illustrating an embodiment of an operation between a host and a storage device.

FIG. 24 is a flowchart illustrating embodiment of an operation between host 200 and storage device 100. The operation between host 200 and storage device 100 according to the present embodiment may correspond to an implementation example of FIG. 20.

Referring to FIG. 24, in operation S1210, host 200 may transmit a delete command including a first snapshot ID ID0 to storage device 100. In operation S1220, storage device 100 may delete at least one snapshot entry, corresponding to the first snapshot ID ID0, of a plurality of snapshot entries stored in a mapping table. In detail, storage device 100 may delete a tuple 241 corresponding to a first key K1 and a tuple 243 corresponding to a second key K2. In operation S1230, storage device 100 may transmit a response message to host 200, representing completion of the deletion of the snapshot entry.

In operation S1240, host 200 may transmit a first read command (for example, a get command) including the first key K1 to storage device 100. In operation S1250, storage device 100 may perform a read operation on a value corresponding to the first key K1. In detail, storage device 100 may read a second value V1b (for example, GHI) included in a second tuple 242 for the first key K1. In operation S1260, storage device 100 may transmit a response message including the second value V1b to host 200.

In operation S1270, host 200 may transmit a second read command (for example, a get command) including the first key K1 and the first snapshot ID ID0 to storage device 100. In operation S1280, storage device 100 may perform a read operation on a value corresponding to the first key K1 and the first snapshot ID ID0. However, since tuple 241 corresponding to the first key K1 and the first snapshot ID ID0 is deleted in operation S1220, storage device 100 fails in the read operation. In operation S1290, the storage device 100 may transmit a response message to host 200, representing a read fail.

Figure 25:
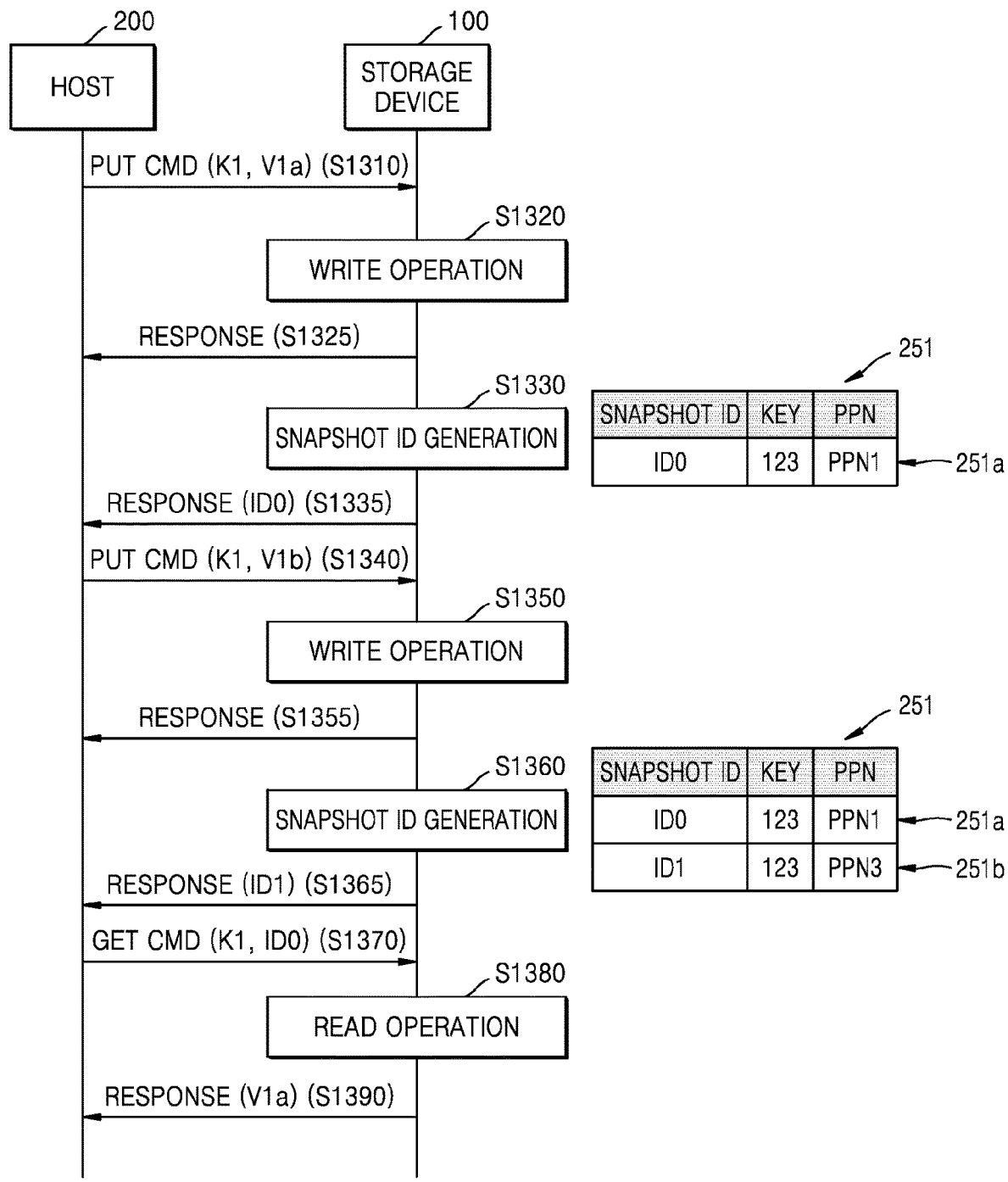

FIG. 25 is a flowchart illustrating an embodiment of an operation between host 200 and storage device 100.

Referring to FIG. 25, in operation S1310, host 200 may transmit a first command (for example, a put command) including a first key K1 and a first value V1a to storage device 100. In operation S1320, storage device 100 may perform a write operation on the first key K1 and the first value V1a. In operation S1325, storage device 100 may transmit a response message, representing completion of writing of the first value V1a, to host 200.

In operation S1330, storage device 100 may generate a first snapshot ID ID0. In an embodiment, storage device 100 may autonomously generate a snapshot ID. In an embodiment, storage device 100 may generate the snapshot ID at a predetermined period. Also, storage device 100 may generate a first snapshot entry 251a corresponding to the first snapshot ID ID0 and may store generated first snapshot entry 251a in a mapping table 251. In this case, first snapshot entry 251a may correspond to mapping data associated with the first key K1 and the first value V1a pre-stored at a time when the first snapshot ID ID0 is generated, and may include the first snapshot ID ID0, the first key K1, and a first physical address PPN1. In operation S1335, storage device 100 may transmit a response message to host 200, representing completion of the generation of the first snapshot ID ID0.

In operation S1340, host 200 may transmit a second command (for example, a put command) including the first key K1 and a second value V1b to storage device 100. In operation S1350, storage device 100 may perform a write operation on the first key K1 and the second value V1b. In operation S1355, storage device 100 may transmit a response message to host 200, representing completion of writing of the second value V1b.

In operation S1360, storage device 100 may generate a second snapshot ID ID1. Also, storage device 100 may generate a second snapshot entry 251b corresponding to the second snapshot ID ID1 and may store generated second snapshot entry 251b in mapping table 251. In this case, second snapshot entry 251b may correspond to mapping data associated with the first key K1 and the second value V1b pre-stored at a time when the second snapshot ID ID1 is generated, and may include the second snapshot ID ID1, the first key K1, and a second physical address PPN3. In operation S1365, storage device 100 may transmit a response message to host 200, representing completion of the generation of the second snapshot ID ID1.

In operation S1370, host 200 may transmit a read command (for example, a get command) including the first key K1 and the first snapshot ID ID0 to storage device 100. In operation S1380, in response to the read command, storage device 100 may read the first value V1a corresponding to the first key K1 at a time when the first snapshot ID ID0 is generated. In operation S1390, storage device 100 may transmit a response message to host 200. including the first value V1a.

Figure 26:
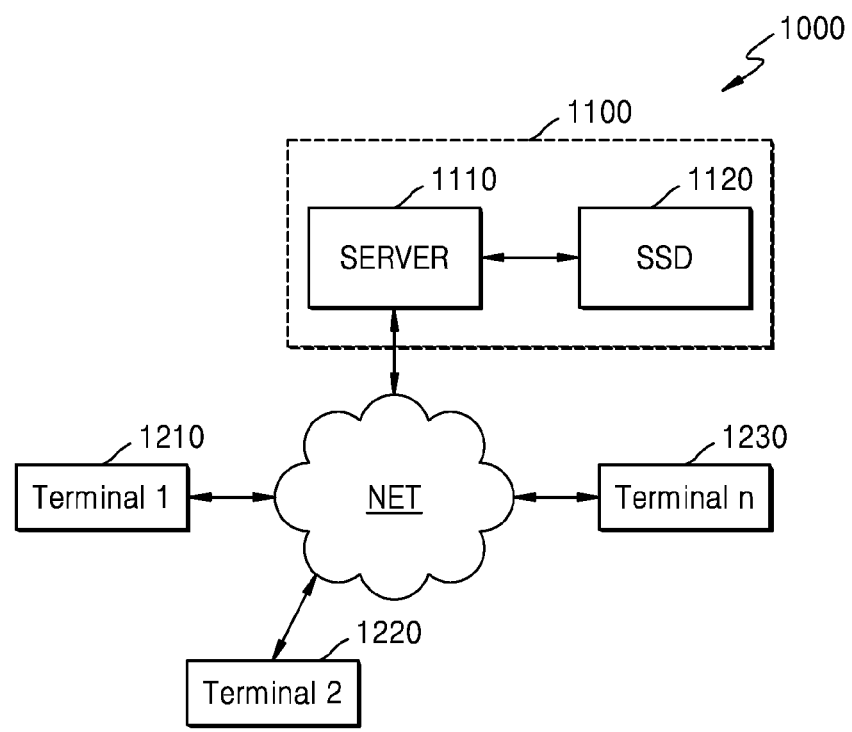
FIGS. 26 and 27 respectively illustrate an embodiment of network systems.

FIG. 26 illustrates an embodiment of a network system 1000.

Referring to FIG. 26, network system 1000 may include a server system (or a server) 1100 and a plurality of terminals 1210 to 1230 (for example, computing nodes) which communicate with server system 1100 over a network NET. Server system 1100 may include a server 1110 and an SSD 1120. In this case, server 1110 may correspond to a host according to the above-described embodiments, and SSD 1120 may correspond to a storage device according to the above-described embodiments. In an embodiment, SSD 1120 may be implemented as an SSD which supports the snapshot function, and may be implemented by using the embodiments described above with reference to FIGS. 1 to 25.

Server 1110 may process requests transmitted from the plurality of terminals 1210 to 1230 connected to the network NET. In an embodiment, server 1110 may transmit a command including a snapshot ID to SSD 1120. In an embodiment, SSD 1120 may generate a plurality of snapshot entries respectively corresponding to a plurality of snapshot IDs, for the same key. In an embodiment, SSD 1120 may perform a write operation and a read operation on a value by using the generated plurality of snapshot entries.

Figure 27:
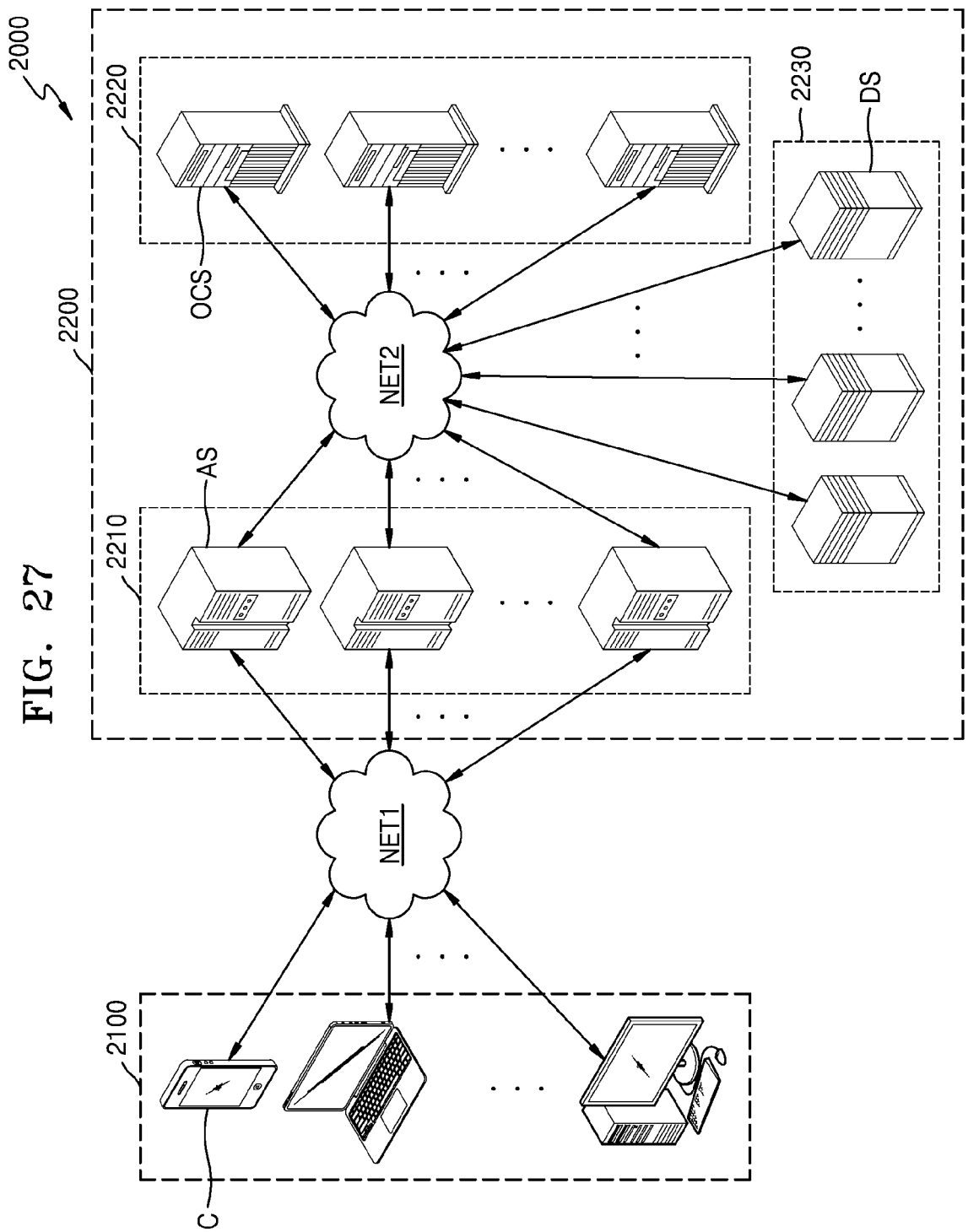

FIG. 27 illustrates an embodiment of a network system 2000.

Referring to FIG. 27, network system 2000 may include a client group 2100 and a data center 2200. Client group 2100 may include a plurality client devices C which communicate with data center 2200 over a first network NET1, for example, Internet. data center 2200 may be equipment which collects all of various pieces of data and provides a service, and may include an application server group 2210, a database server group 2220, and an object cache server group 2230 which communicate with one another over a second network NET2 (for example, a local area network (LAN) or Intranet).

Application server group 2210 may include a plurality of application server devices AS. The application server devices AS may process a request received from client group 2100 and may access database server group 2220 or object cache server group 2230 according to the request of client group 2100. Database server group 2220 may include a plurality of database server devices DS which store data obtained through processing by the application server devices AS. Object cache server group 2230 may include a plurality of object cache server devices OCS which temporarily store data stored in the database server devices DS or data read from the database server devices DS. Therefore, object cache server group 2230 may perform a cache function between the application server devices AS and the database server devices DS. In the present embodiment, each of the object cache server devices OCS may be a key-value storage device which supports the snapshot function, and may be implemented by using the embodiments described above with reference to FIGS. 1 to 25.

Figure 28:
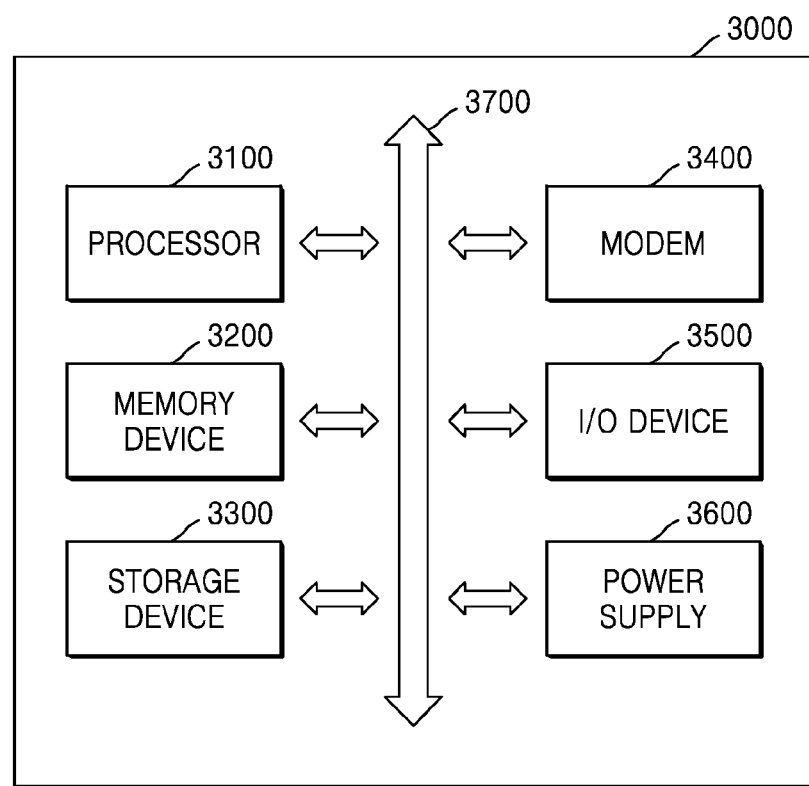
FIG. 28 illustrates an embodiment of an electronic device.

FIG. 28 illustrates an embodiment of an electronic device 3000.

Referring to FIG. 28, electronic device 3000 may include a processor 3100, a memory device 3200, a storage device 3300, a modem 3400, an input/output (I/O) device 3500, and a power supply 3600. In the present embodiment, storage device 3300 may be a key-value storage device which supports the snapshot function, and may be implemented by using the embodiments described above with reference to FIGS. 1 to 25. In an embodiment, storage device 3300 may receive a command including a snapshot ID. In an embodiment, storage device 3300 may generate a plurality of snapshot entries respectively corresponding to a plurality of snapshot IDs, for the same key. In an embodiment, storage device 3300 may perform a write operation and a read operation on a value by the generated plurality of snapshot entries.

While the inventive concept has been particularly shown and described with reference to embodiments thereof, it will be understood that various changes in form and details may be made therein without departing from the spirit and scope of the following claims.

What is claimed is:
1. A method, comprising:
   a key-value storage device receiving a first command from a host, the first command including a first key, a first value, and a first snapshot identification (ID);
   in response to the received first command, the key-value storage device generating a first snapshot entry;

the key-value storage device receiving a second command from the host, the second command including the first key, a second value, and a second snapshot ID; and in response to the received second command, the key-value storage device generating a second snapshot entry, wherein the key-value storage device further comprises a mapping table memory into which a mapping table storing the first and second snapshot entries is loaded, wherein the first snapshot entry includes the first snapshot ID, the first key, a first physical address in a non-volatile memory of the key-value storage device at which the first value is written, and one of a first flag and a first link region, and wherein the second snapshot entry includes the second snapshot ID, the first key, a second physical address in the non-volatile memory of the key-value storage device at which the second value is written, and one of a second flag and a second link region, wherein when the first snapshot entry includes the first flag and the second snapshot entry includes the second flag, the first flag has a first flag value indicating that the first snapshot entry is not the latest snapshot entry, and the second flag has a second flag value indicating that the second snapshot entry is the latest snapshot entry, and wherein when the first snapshot entry includes the first link region and the second snapshot entry includes the second link region, the first and second snapshot entries are implemented as a linked list in an order of the second snapshot entry to the first snapshot entry and the second link region is configured to store therein a memory address in the mapping table memory at which the first snapshot entry is stored.

2. The method of claim 1, further comprising:
the key-value storage device receiving a read command including the first key from the host; and
in response to the received read command, the key-value storage device reading the second value from the non-volatile memory, based on the second snapshot entry.

3. The method of claim 1, further comprising at least one of:
in response to a first read command including the first snapshot ID and the first key received from the host, the key-value storage device reading the first value from the non-volatile memory, based on the first snapshot entry; and
in response to a second read command including the second snapshot ID and the first key received from the host, the key-value storage device reading the second value from the non-volatile memory, based on the second snapshot entry.

4. The method of claim 1, wherein the method further comprises at least one of:
in response to a first delete command, including the first snapshot ID, received from the host, the key-value storage device deleting at least one snapshot entry corresponding to the first snapshot ID from among the plurality of snapshot entries; and
in response to a second delete command including the first snapshot ID and the first key received from the host, the key-value storage device deleting the first snapshot entry from among the plurality of snapshot entries.

5. The method of claim 4, further comprising at least one of:

in response to a first read command including the first key received from the host, the key-value storage device reading the second value from the non-volatile memory, based on the second snapshot entry; and in response to a second read command including the first snapshot ID and the first key received from the host, the key-value storage device providing a fail message to the host.

6. The method of claim 1, further comprising:
in response to the first command, the key-value storage device writing the first value at the first physical address of the non-volatile memory; and
in response to the second command, the key-value storage device writing the second value at the second physical address of the non-volatile memory.

7. The method of claim 1, wherein the first snapshot entry includes the first link region and the second snapshot entry includes the second link region and the first and second snapshot entries are implemented as a the linked list in the order of the second snapshot entry to the first snapshot entry.

8. The method of claim 7, wherein the first link region is configured to store therein information indicating that there is no snapshot entry for the key generated before the first snapshot entry.

9. The method of claim 1, wherein the first snapshot entry includes the first flag and the second snapshot entry includes the second flag,
the first flag has the first flag value indicating that the first snapshot entry is not the latest snapshot entry, and the second flag has the second flag value indicating that the second snapshot entry is the latest snapshot entry
the second flag has the second flag value indicating that the second snapshot entry is the latest snapshot entry.

10. The method of claim 1, wherein:
the key-value storage device further comprises dynamic random access memory (DRAM) and static random access memory (SRAM), and
the first snapshot entry is stored in the DRAM, and the second snapshot entry is stored in the SRAM.

11. A method, comprising:
a key-value storage device storing in a mapping table memory a mapping table having a plurality of snapshot entries for a first key, the plurality of snapshot entries respectively corresponding to a plurality of snapshot identifications (IDs);
the key-value storage device receiving a first read command from a host, the first read command including the first key;
in response to the received first read command, the key-value storage device performing a read operation on a non-volatile memory, based on a latest snapshot entry of the plurality of snapshot entries;
the key-value storage device receiving a second read command from the host, the second read command including a first snapshot ID and the first key-; and
in response to the received second read command, the key-value storage device performing a second read operation on the non-volatile memory, based on a first snapshot entry corresponding to the first snapshot ID among the plurality of snapshot entries,
wherein the plurality of snapshot entries for the first key include at least the first snapshot entry and a second snapshot entry,
wherein the first snapshot entry includes the first snapshot ID, the first key, a first physical address in the non-volatile memory at which a first value is written, and one of a first flag and a first link region, and wherein the second snapshot entry includes a second snapshot ID, the first key, a second physical address in the non-volatile memory at which a second value is written, and one of a second flag and a second link region, wherein when the first snapshot entry includes the first flag and the second snapshot entry includes the second flag, the first flag has a first flag value indicating that the first snapshot entry is not the latest snapshot entry, and the second flag has a second flag value indicating that the second snapshot entry is the latest snapshot entry, and wherein when the first snapshot entry includes the first link region and the second snapshot entry includes the second link region, the first and second snapshot entries are implemented as a linked list in an order of the second snapshot entry to the first snapshot entry and the second link region is configured to store therein a memory address in the mapping table memory at which the first snapshot entry is stored.

12. The method of claim 11, wherein the first snapshot entry includes the first flag and the second snapshot entry includes the second flag.

13. The method of claim 11, wherein the first snapshot entry includes the first link region and the second snapshot entry includes the second link region, and wherein the plurality of snapshot entries are implemented as the linked list in the order of the latest snapshot entry to a previous snapshot entry.

14. The method of claim 11, wherein the storing of the plurality of snapshot entries in the mapping table comprises:
receiving a first command from the host, the first command including the first key, the first value, and the first snapshot ID;
in response to the received first command, the key-value storage device generating the first snapshot entry;
receiving a second command from the host, the second command including the first key, the second value, and the second snapshot ID; and
in response to the received second command, the key-value storage device generating the second snapshot entry.

15. A key-value storage device capable of communicating with a host, the key-value storage device comprising:
a non-volatile memory configured to store a value corresponding to a key; and
a controller configured to receive from the host a command including a snapshot identification (ID), the key, and the value, and in response to the command to generate a first snapshot entry including the snapshot ID, the key, a physical address in the non-volatile memory at which the value is written, and one of a first flag and a first link region, wherein when the first snapshot entry includes the first flag, the first flag has one of a first flag value indicating that the first snapshot entry is not the latest snapshot entry for the key and a second flag value indicating that the first snapshot entry is the latest snapshot entry for the key, and wherein when the first snapshot entry includes the first link region, the first link region is configured to store therein one of: a first address in a mapping table memory at which a previous snapshot entry is stored, and information indicating that there is no other snapshot entry for the key generated before the first snapshot entry.

16. The key-value storage device of claim 15, wherein the controller is further configured to implement a plurality of snapshot entries corresponding to the key as a linked list in an order of a latest snapshot entry to the previous snapshot entry.

17. The key-value storage device of claim 16, wherein the controller is further configured such that:
when a first read command including the key is received from the host, in response to the first read command, the controller controls a first read operation on the non-volatile memory, based on the latest snapshot entry corresponding to the key, and
when a second read command including the key and the first snapshot ID is received from the host, in response to the second read command, the controller controls a second read operation on the non-volatile memory, based on the first snapshot entry corresponding to the first snapshot ID.

18. The key-value storage device of claim 16, wherein the mapping table stores a plurality of snapshot entries, and wherein the controller is further configured such that:
when a first delete command including the snapshot ID is received from the host, in response to the first delete command, the controller deletes at least one snapshot entry corresponding to the snapshot ID in the mapping table, and
when a second delete command including the key and the snapshot ID is received from the host, in response to the second delete command, the controller deletes a snapshot entry corresponding to the key and the snapshot ID in the mapping table.

19. The method of claim 1, where the first flag value is one of a 1 and a 0, and the second flag value is an opposite one of the 1 and 0 as the first flag value.

20. The method of claim 11, where the first flag value is one of a 1 and a 0, and the second flag value is an opposite one of the 1 and 0 as the first flag value.

* * * * *